(12) United States Patent
Kobayashi et al.

(10) Patent No.: US 6,801,664 B1
(45) Date of Patent: Oct. 5, 2004

(54) METHOD OF IMAGE CODING, IMAGE CODING APPARATUS, AND RECORDING MEDIUM INCLUDING IMAGE CODING PROGRAM

(75) Inventors: Masaaki Kobayashi, Fukuoka (JP); Seiichiro Hiratsuka, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/510,057

(22) Filed: Feb. 22, 2000

(30) Foreign Application Priority Data

| Feb. 22, 1999 | (JP) | 11-042545 |
| Mar. 2, 1999 | (JP) | 11-054109 |
| May 20, 1999 | (JP) | 11-139737 |

(51) Int. Cl.[7] .................... G06K 9/36; G06K 15/00; H04N 1/40

(52) U.S. Cl. .................... 382/237; 382/252; 358/3.05; 358/3.06

(58) Field of Search .................. 382/237, 238, 382/239, 232, 247, 244, 251, 252; 358/3.06–3.13, 3.14, 3.05, 3.03, 3.01, 1.9

(56) References Cited

U.S. PATENT DOCUMENTS 5,764,807 A * 6/1998 Pearlman et al. .......... 382/240

FOREIGN PATENT DOCUMENTS

| JP | 03034680 A | * 2/1991 | ............ H04N/1/40 |
| JP | 05219382 A | * 8/1993 | ............ H04N/1/41 |

* cited by examiner

Primary Examiner—Wenfeng Chen
(74) Attorney, Agent, or Firm—RatnerPrestia

(57) ABSTRACT

A continuous-tone image data is converted to a bi-level image data by halftoning conversion, then the bi-level image data i.e. binary image data is compressed by compressing means including predictive coding and image data compressing. These operations are done in a image coding apparatus. In this apparatus, when the continuous-tone image is converted into bi-level image data in halftoning so that predictions of predictive coding become strong. As a result, halftoning conversion is performed within a scope of binary image-coding-rules. This permits to produce a binary data easy to compress. Compressing a binary data in a low distortion quality and at a high compression rate is achievable through a method of image coding, and by an image coding apparatus of the present invention. Also a recording medium including a program carrying out this method is obtainable.

7 Claims, 29 Drawing Sheets

| X1 | X2 | X3 | X4 | X0 |
|----|----|----|----|----|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 0 |
| 1 | 1 | 1 | 0 | 1 |
| 1 | 1 | 1 | 1 | 1 |

| X1 | X2 | X3 |
|----|----|----|
| X5 | X  |    |

Fig.7(b)

| X1 | X2 | X3 | X4 | P(X0=0) | P(X0=1) |
|----|----|----|----|---------|---------|
| 0  | 0  | 0  | 0  | 0.99    | 0.01    |
| 0  | 0  | 0  | 1  | 0.99    | 0.01    |
| 0  | 0  | 1  | 0  | 0.86    | 0.14    |
| 0  | 0  | 1  | 1  | 0.99    | 0.01    |
| 0  | 1  | 0  | 0  | 0.81    | 0.19    |
| 0  | 1  | 0  | 1  | 0.85    | 0.15    |
| 0  | 1  | 1  | 0  | 0.34    | 0.66    |
| 0  | 1  | 1  | 1  | 0.64    | 0.36    |
| 1  | 0  | 0  | 0  | 0.34    | 0.66    |
| 1  | 0  | 0  | 1  | 0.68    | 0.32    |
| 1  | 0  | 1  | 0  | 0.01    | 0.99    |
| 1  | 0  | 1  | 1  | 0.17    | 0.83    |
| 1  | 1  | 0  | 0  | 0.13    | 0.87    |
| 1  | 1  | 0  | 1  | 0.61    | 0.39    |
| 1  | 1  | 1  | 0  | 0.01    | 0.99    |
| 1  | 1  | 1  | 1  | 0.01    | 0.99    |

Fig.7(c)

| X1 | X1 | X1 | X1 | Density determination |
|----|----|----|----|-----------------------|
| 0  | 0  | 0  | 0  | L, H                  |
| 0  | 0  | 1  | 1  | L, H                  |
| 0  | 0  | 0  | 0  | L, H                  |
| 0  | 1  | 1  | 1  | L, H                  |
| 0  | 0  | 0  | 0  | L, H                  |
| 0  | 1  | 1  | 1  | L, H                  |
| 0  | 0  | 0  | 0  | M                     |
| 1  | 1  | 0  | 0  | M                     |
| 0  | 0  | 0  | 1  | M                     |
| 1  | 1  | 1  | 1  | L, H                  |
| 0  | 0  | 1  | 1  | L, H                  |
| 1  | 1  | 1  | 1  | L, H                  |
| 0  | 0  | 1  | 1  | M                     |
| 1  | 1  | 1  | 1  | L, H                  |
| 0  | 0  | 1  | 1  | L, H                  |
| 1  | 1  | 1  | 1  | L, H                  |

L: low density
H: high density
M: medium density

|  |  |  |
|---|---|---|
| X1 | X2 | X3 |
| X4 | X |  |

Fig. 14(b)

| X1 | X2 | X3 | X4 | X0 |
|----|----|----|----|----|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 0 | 1 | 0 | 0 |
| 0 | 1 | 0 | 1 | 0 |
| 0 | 1 | 1 | 0 | 0 |
| 0 | 1 | 1 | 1 | 1 |
| 0 | 1 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

| X1 | X2 | X3 |
|----|----|----|
| X4 | X  |    |

Fig. 20(b)

| X1 | X2 | X3 | X4 | X0 |
|----|----|----|----|----|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 0 |
| 1 | 1 | 1 | 0 | 1 |
| 1 | 1 | 1 | 1 | 1 |

: Target block to be coded

: Reference block

: Prediction "hit" pixel

: Prediction "miss" pixel

: Solid line

: Broken line

: Unit of blocked data in series

: Prediction "hit" pixel

: Prediction "miss" pixel

: Blocked data

: Hilbert sequence scanning order

Fig. 26
Fig. 26(a)
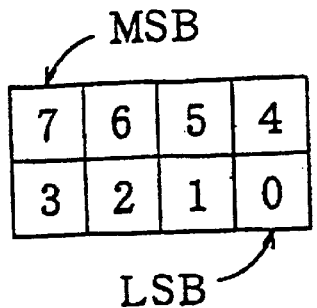
Fig. 26(b)
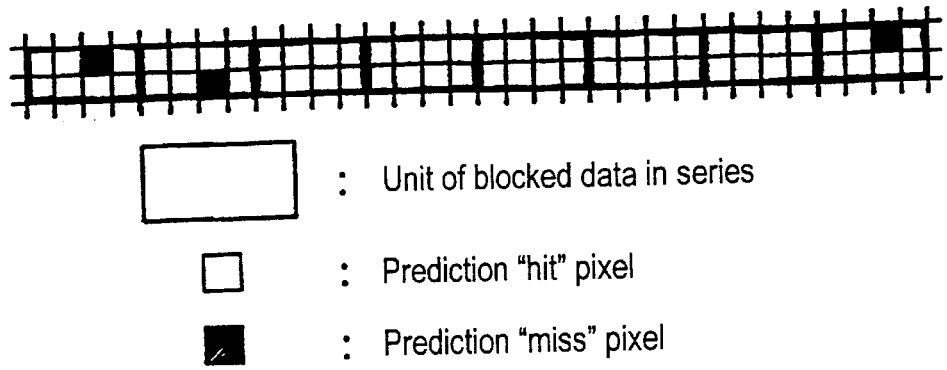
Fig. 26(c)
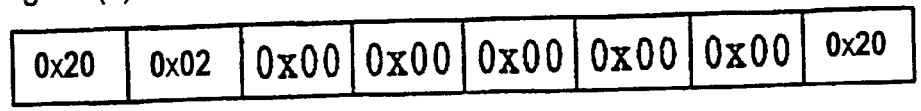
Fig. 26(d)
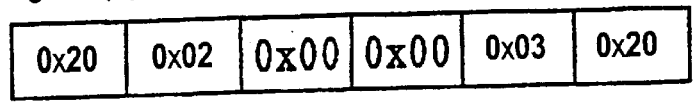
Fig. 26(e)
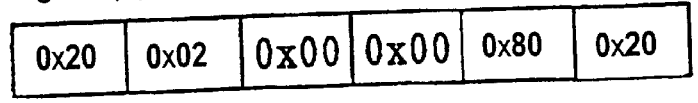

Fig. 27

| Run-data | Occurrence probability | Blocked data | Occurrence probability |
|---|---|---|---|
| 0x00 | 0.033 | 0x01 | 0.049 |
| 0x01 | 0.042 | 0x02 | 0.052 |
| 0x02 | 0.034 | 0x10 | 0.051 |
| 0x03 | 0.031 | 0x80 | 0.048 |
| 0x04 | 0.029 | 0x20 | 0.047 |
| 0x05 | 0.028 | 0x40 | 0.046 |
| 0x06 | 0.022 | 0x04 | 0.045 |
| 0x07 | 0.021 | 0x08 | 0.044 |
| 0x08 | 0.018 | 0x18 | 0.044 |
| 0x09 | 0.015 | 0x28 | 0.042 |
| 0x0A | 0.014 | 0x24 | 0.041 |
| 0x0B | 0.012 | 0x41 | 0.039 |
| 0x0C | 0.011 | 0x81 | 0.039 |
| 0x0D | 0.009 | 0x48 | 0.038 |
| 0x0E | 0.007 | 0x12 | 0.036 |
| 0x0F | 0.007 | 0x42 | 0.033 |
| ≀ | ≀ | ≀ | ≀ |
| 0xF0 | 0.001 | 0xDE | 0.001 |
| 0xF1 | 0.001 | 0x7E | 0.001 |
| 0xF2 | 0.001 | 0xBE | 0.001 |
| 0xF3 | 0.001 | 0xEB | 0.001 |
| 0xF4 | 0.001 | 0xB7 | 0.001 |
| 0xF5 | 0.001 | 0xED | 0.001 |
| 0xF6 | 0.001 | 0x7F | 0.001 |
| 0xF7 | 0.001 | 0xF7 | 0.001 |
| 0xF8 | 0.001 | 0xBF | 0.001 |
| 0xF9 | 0.001 | 0xFB | 0.001 |
| 0xFA | 0.001 | 0xDF | 0.001 |
| 0xFB | 0.001 | 0xFD | 0.001 |
| 0xFC | 0.001 | 0xEF | 0.001 |
| 0xFD | 0.001 | 0xFE | 0.001 |
| 0xFE | 0.001 (Min) | 0xFF | 0.001 (Min) |
| 0xFF | 0.105 (Max) | 0x00 | 0.063 (Max) |

METHOD OF IMAGE CODING, IMAGE CODING APPARATUS, AND RECORDING MEDIUM INCLUDING IMAGE CODING PROGRAM

FIELD OF THE INVENTION

The present invention relates to a method of coding a continuous-tone image including a halftoning conversion at data output means such as printers, copiers, facsimiles and the like, and data compression. The present invention also relates to an image coding apparatus and a recording medium containing an image coding program.

BACKGROUND OF THE INVENTION

Printers, copiers, facsimiles and the like have developed their functions into the higher resolution, higher picture quality and outputting color data. Those technical trends require data-compression techniques for achieving considerable economies in the resources used to store and transmit image data. Image-data-compression, in particular, is a key technique to avoid distortion of picture quality.

Lossless data compression technique is well known for compressing image data, this technique includes arithmetic coding, Huffman transform, modified Huffman (MH) coding, modified READ (MR) coding and other methods combining predictive coding with one of those coding methods.

However, those coding methods have not achieved a substantial compression rate over pseudo-half-tone bi-level image: data that is made from a natural image undergoing the halftoning conversion.

To overcome this problem, a prior art takes the following measures: an image data is binary coded, and before the image data is compressed the binary coded data is converted to a data sequence for the lossless compression method to compress at a high compression rate. As a result, a compression rate increases.

A conventional method concerning the technique compressing pseudo-half-tone bi-level image data is described hereinafter with reference to FIG. 28 through FIG. 30. This bi-level image data is halftoning-converted from a continuous-tone image.

FIG. 28 is a block diagram illustrating conventional methods of halftoning conversion and compression of a continuous-tone image.

In FIG. 28, when a continuous-tone image data is input, halftoning converter 1 converts the image into a pseudo-half-tone bi-level image, thereby producing a binary image data. Data converter 2 converts the binary image data to a binary data sequence allowing data conversion at a high compression rate.

Predictive coding apparatus 3 provides this binary data sequence with predictive coding referring to the surrounding pixels already coded, and the data sequence is transformed to a data sequence where "1" is put only to the pixels having different values from the predicted values, i.e. the pixels inaccurately predicted. Entropy-coding apparatus 4 applies Huffman coding or arithmetic coding to the data sequence supplied from predictive coding apparatus 3, thereby producing compressed binary data.

FIG. 29 illustrates an example of data converted by data converter 2. FIG. 29($a$) shows the data before conversion, and FIG. 29($b$) shows binary image data after the conversion. Data converter 2 converts the data so that a number of pixel patterns frequently appearing can increase, whereby a data sequence allowing data conversion at a high compression rate can be produced.

FIG. 30 illustrates predictive coding of a binary image data. In FIG. 30($a$), coding is predicted by referring to four pixels X1, X2, X3 and X4, and there are 16 statuses of the four pixels, i.e. $2^4=16$. Considering those 16 statuses, predictive coding apparatus 3 prepares predictive functions f(X) in the following manner:

f(X1, X2, X3, X4)=1 for the patterns of pixels that has a strong probability of rendering a present pixel X to take "1".

f(X1, X2, X3, X4)=0 for the patterns of pixels that has a strong probability of rendering a present pixel X to take "0".

Predictive coding apparatus 3 predicts the coding with this predictive function f(X), and as shown in FIG. 30($b$), performs the predictive coding by allowing the pixel inaccurately predicted to output "1" and the pixel accurately predicted to output "0".

However, the conventional method discussed above encounters data deviating from a rule of binary coding when data converter 2 converts a binary data to a data sequence allowing data compression at a high compression rate. This results in lowering substantially picture quality.

SUMMARY OF THE INVENTION

The present invention addresses the problem discussed above and aims to provide a method of coding a continuous-tone image, an image coding apparatus for a continuous-tone image, and a recording medium containing an image coding program. These method, coding apparatus and medium realize a compression of binary image data at a high compression rate and with a quality picture.

BRIEF DESCRIPTION OF THE DRAWINGS

FIG. 4($b$) shows a table of predictive functions.

FIG. 7($a$) depicts reference pixels used for determining a density.

FIG. 7($b$) shows an example of appearing probability of "0" and "1" of converted pixels corresponding to respective reference pixels.

FIG. 7($c$) shows an example of density determination corresponding to respective reference pixels.

FIG. 14 depicts a pixel to be converted and reference pixels, and a table of predictive functions corresponding to those pixels.

FIG. 20(a) depicts reference pixels.

FIG. 20(b) shows a predictive table depicting a case when four reference pixels are available.

FIG. 26(a) illustrates a blocked-data and a bit-allocation to each pixel when a threshold value is 2.

FIG. 26(b) illustrates a data sequence by the prediction.

FIG. 26(c) illustrates a blocked-data.

FIG. 26(d) illustrates a run-data.

FIG. 26(e) illustrates a run-data using the appearance frequency and a corresponding table.

FIG. 27 is a table depicting respective run-length data when the maximum run-length is 255 and which Huffman code is used correspondingly.

DETAILED DESCRIPTION OF EXEMPLARY EMBODIMENT

Exemplary Embodiment 1

The first exemplary embodiment of the present invention is demonstrated hereinafter.

Figure 1:
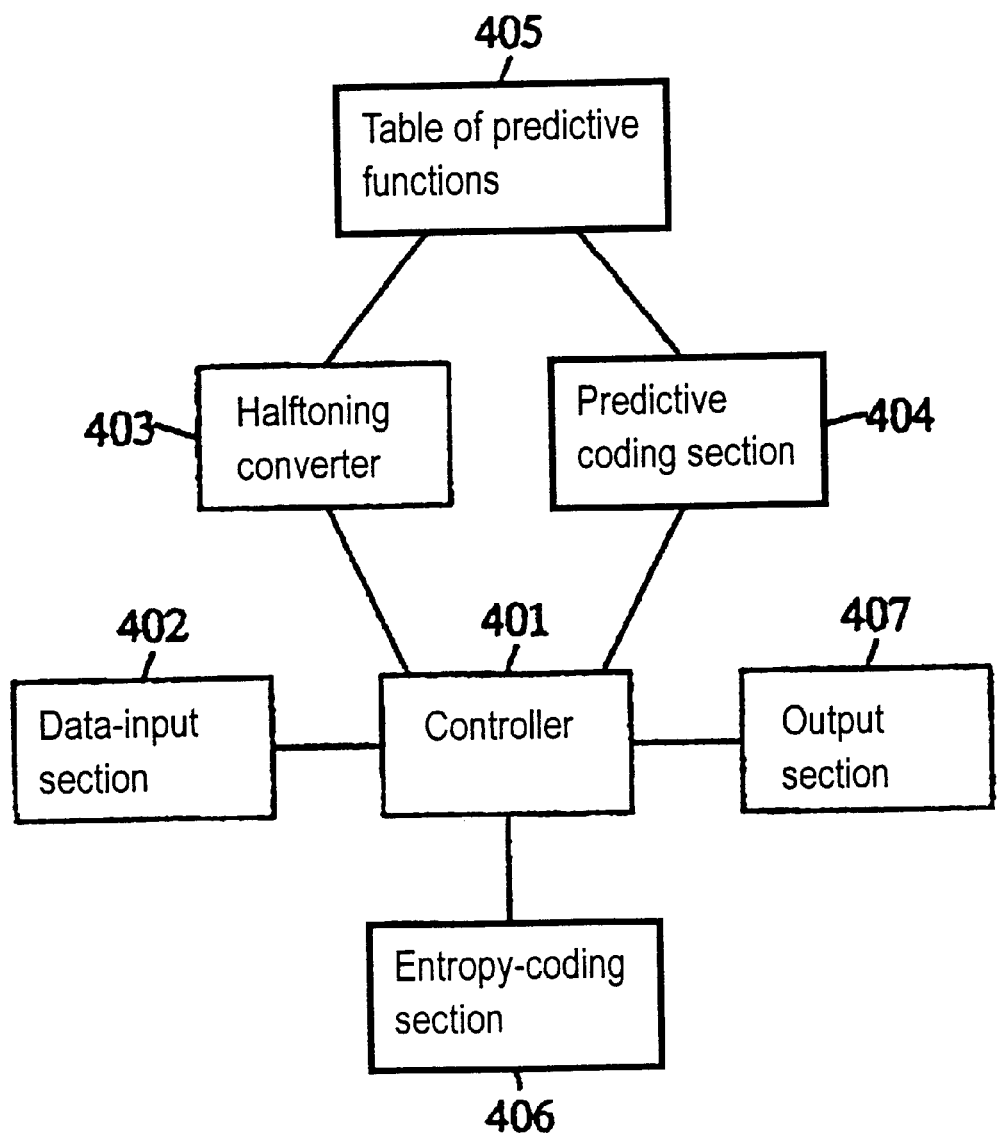
FIG. 1 illustrates a structure of an image coding apparatus for a continuous-tone image in accordance with a first exemplary embodiment of the present invention.
Figure 2:
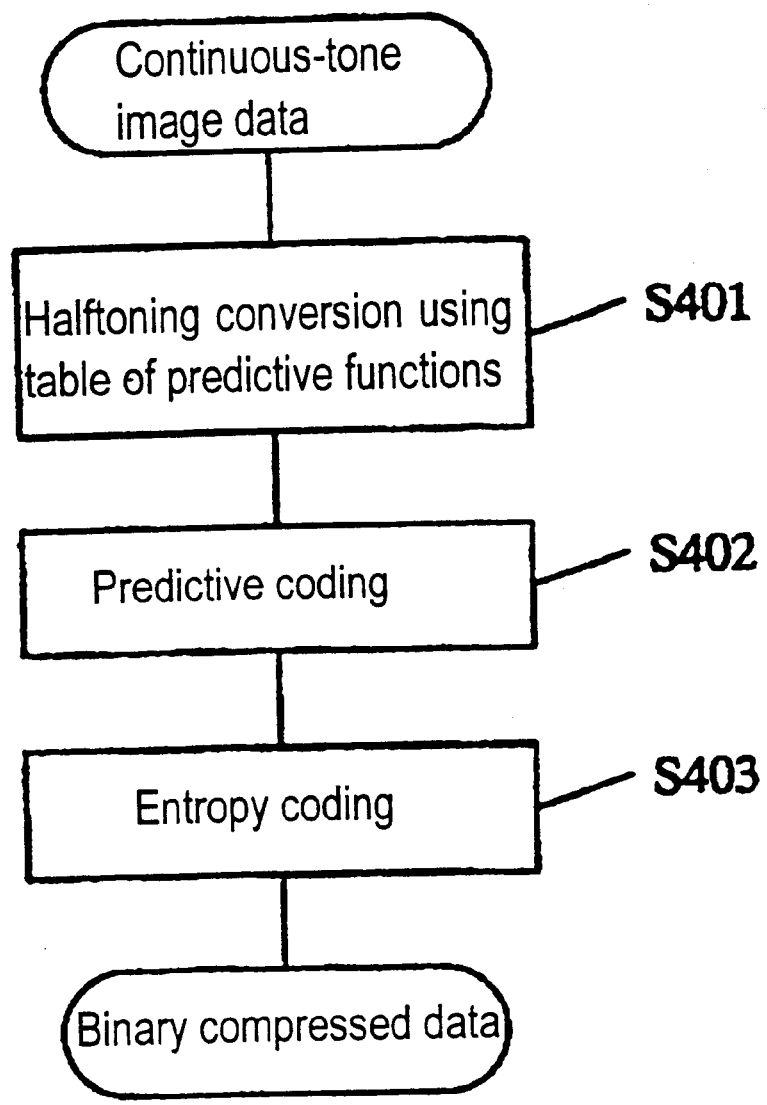
FIG. 2 is a flowchart illustrating an operation of the image coding apparatus for a continuous-tone image in accordance with the first exemplary embodiment of the present invention.

FIG. 1 illustrates a structure of an image coding apparatus for a continuous-tone image in accordance with the first exemplary embodiment of the present invention. FIG. 2 is a flowchart illustrating an operation of the image coding apparatus for a continuous-tone image in accordance with the first exemplary embodiment of the present invention.

The operating process of image coding apparatus shown in FIG. 1 is demonstrated with reference to the flowchart in FIG. 2. First, controller 401 receives an input image, i.e. continuous-tone image data, from data-input section 402, which then transfer the data to halftoning converter 403. Converter 403 converts the data into a bi-level data through an error-distribution method. At this time, converter 403 refers to table 405 listing predictive functions, and thereby to consider the correspondence between statuses of coded surrounding pixels and a predicted value to be output. Converter 403 then changes a threshold value of binary coding so that a probability of outputting the same value as the predicted value becomes high, and produces the bi-level image data, i.e. binary data with the changed threshold value (S401).

Next, controller 401 calls predictive coding section 404, i.e. compressing means. Section 404 refers to table 405 based on the information of the coded surrounding pixels and then predicts a converted value output from halftoning converter 403 and compares the predicted value with the converted value. Predictive coding section 404 then transforms the binary data into a data sequence so that pixels hitting the prediction takes "0" and pixels missing the prediction takes "1" (S402). Controller 401 then calls entropy-coding section 406, which provides the binary data sequence with an entropy-coding. This binary data sequence represents hitting or missing the prediction, where this "hit or miss" is supplied from predictive coding section 404 (S403). Finally, controller 401 outputs the binary compressed data from output section 407.

Respective structural elements of the image coding apparatus are specifically described hereinafter.

Figure 3:
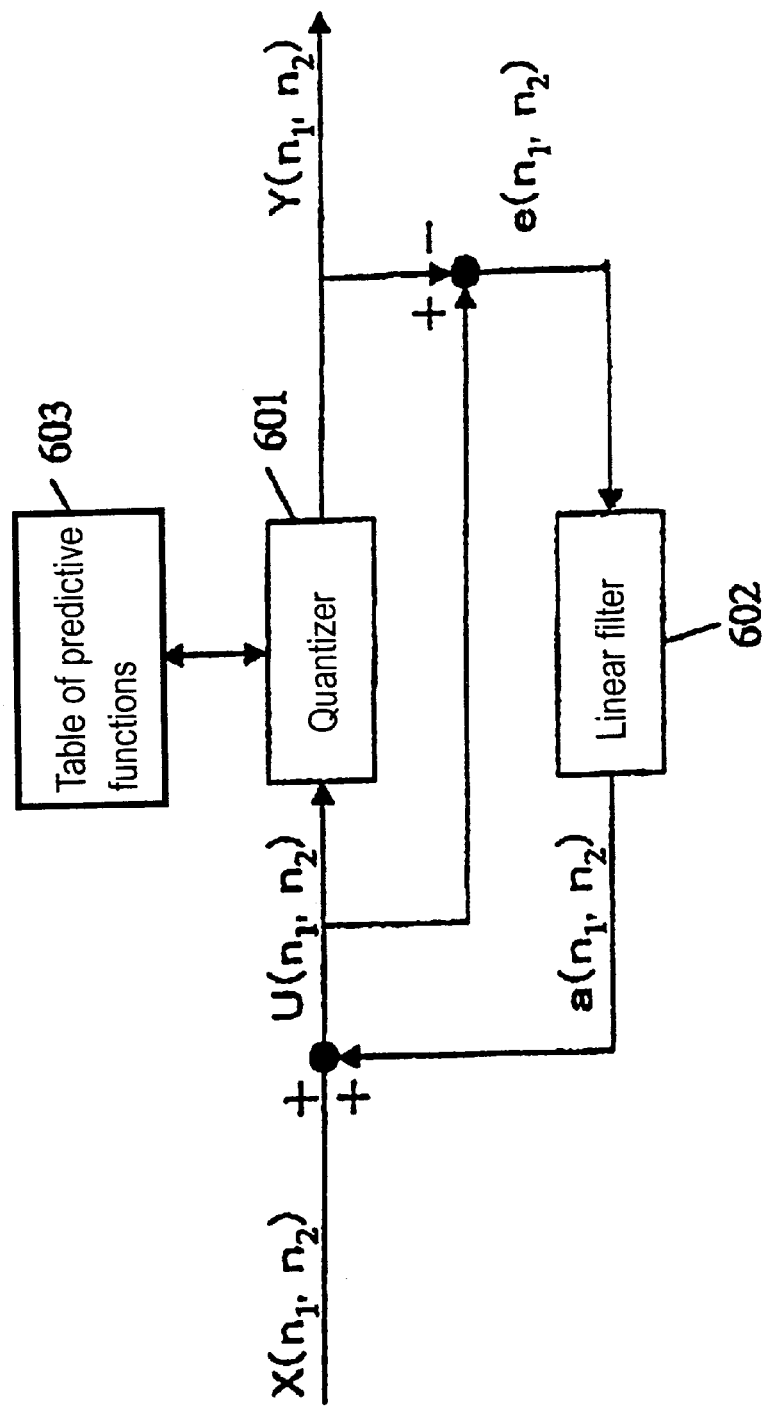
FIG. 3 depicts an error-distribution method.

First, halftoning converter 403 converts continuous-tone image data into bi-level image data, i.e. binary data using the error-distribution method. FIG. 3 depicts the error-distribution method. In FIG. 3, converter 403 adds quantizing-noise "a" (n1, n2) produced responding to actual images to input-pixel-value X (n1, n2) which is a continuous-tone image data. Hereon,(n1,n2) expresses a two dimensional position of a pixel.

Feedback process in FIG. 3 corresponds to this process. Quantizing-noise "a" (n1, n2) is diffused by flowing quantizing error "e" (n1, n2) through linear filter 602. Quantizer 601 quantizes an input value U (n1, n2) made up by adding noise "a" (n1, n2) to input-pixel-value X (n1, n2), thereby producing output value Y (n1, n2). A quantization process, in general, is expressed with equation (1), where "Th" is quantizing threshold value.

However, in the quantization process in this embodiment, quantizer 601 refers to table 603 listing predictive functions, then changes threshold value "Th", and performs the quantization. In other words, quantizer 601 changes threshold value "Th" so that "Th" increases when the predictive value is "0" and "Th" decreases when the predictive value of output value Y is "1" before performing the quantization.

This process allows the prediction probability of predictive section 404 to be strong and the compression rate to increase. When a predicted value is "0", the quantizating process is expressed with equation (2), and when "1" the process is expressed with equation (3), where Δ is a value changed from the threshold value.

$$Y(n1, n2)=1\{U(n1, n2) \geq Th\}, \text{ or}$$
$$0\{U(n1, n2)<Th\} \quad (1)$$

$$Y(n1, n2)=1\{U(n1, n2) \geq Th+\Delta\}, \text{ or}$$
$$0\{U(n1, n2)<Th+\Delta\} \quad (2)$$

$$Y(n1, n2)=1\{U(n1, n2) \geq Th-\Delta\}, \text{ or}$$
$$0\{U(n1, n2)<Th-\Delta\} \quad (3)$$

Figures 4, 4A, 4B:
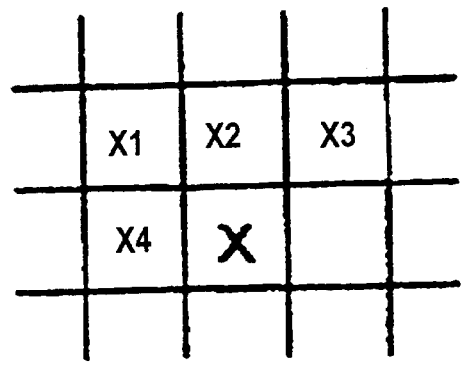
FIG. 4($a$) depicts reference pixels at a predictive coding of a binary image data.

Predictive coding section 404 refers to table 405 based on coded pixels surrounding the pixel to be coded, then predicts whether the pixel to be coded is "0" or "1". A number of the reference pixels to be used for the prediction may be four pixels or 12 surrounding pixels. FIG. 4 shows a table listing predictive functions in a case of four surrounding pixels as reference pixels. FIG. 4(a) shows an arrangement of reference pixels, and FIG. 4(b) shows a table storing predicted values. Addresses of table 405 are referred to based on the statuses of surrounding pixels X1–X4, and value X0 on the address is predicted. When predicted value X0 hits an actual output value from converter 403, pixel X takes "0", and when value X0 misses an actual output value from converter 403, pixel X takes "1", so that the predictive coding is performed.

Finally, entropy-coding section 406 provides an entropy-coding to the binary data sequence produced by predictive coding section 404. Huffman coding or arithmetic coding is one of the entropy-coding method.

Exemplary Embodiment 2

Figure 5:
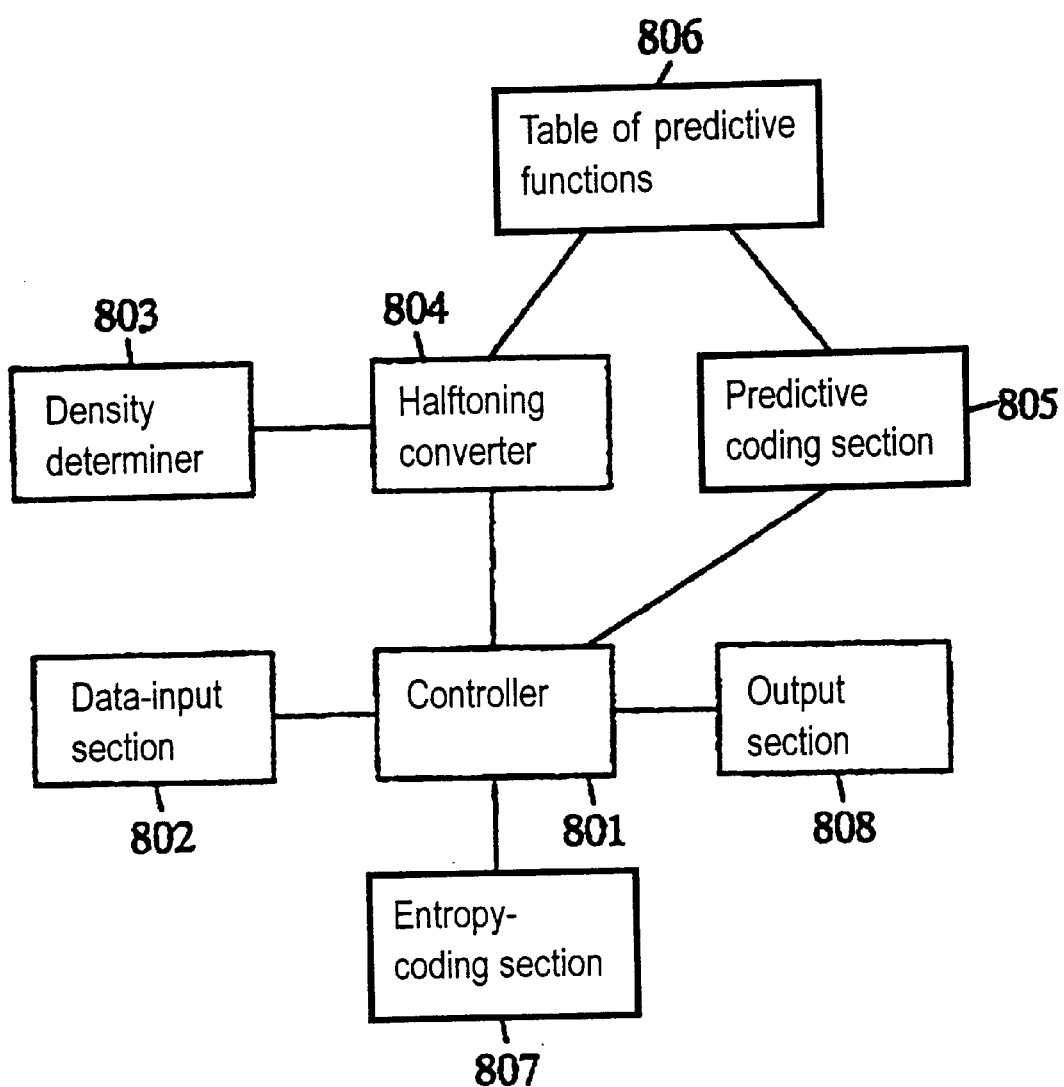
FIG. 5 illustrates a structure of an image coding apparatus for a continuous-tone image in accordance with a second exemplary embodiment of the present invention.
Figure 6:
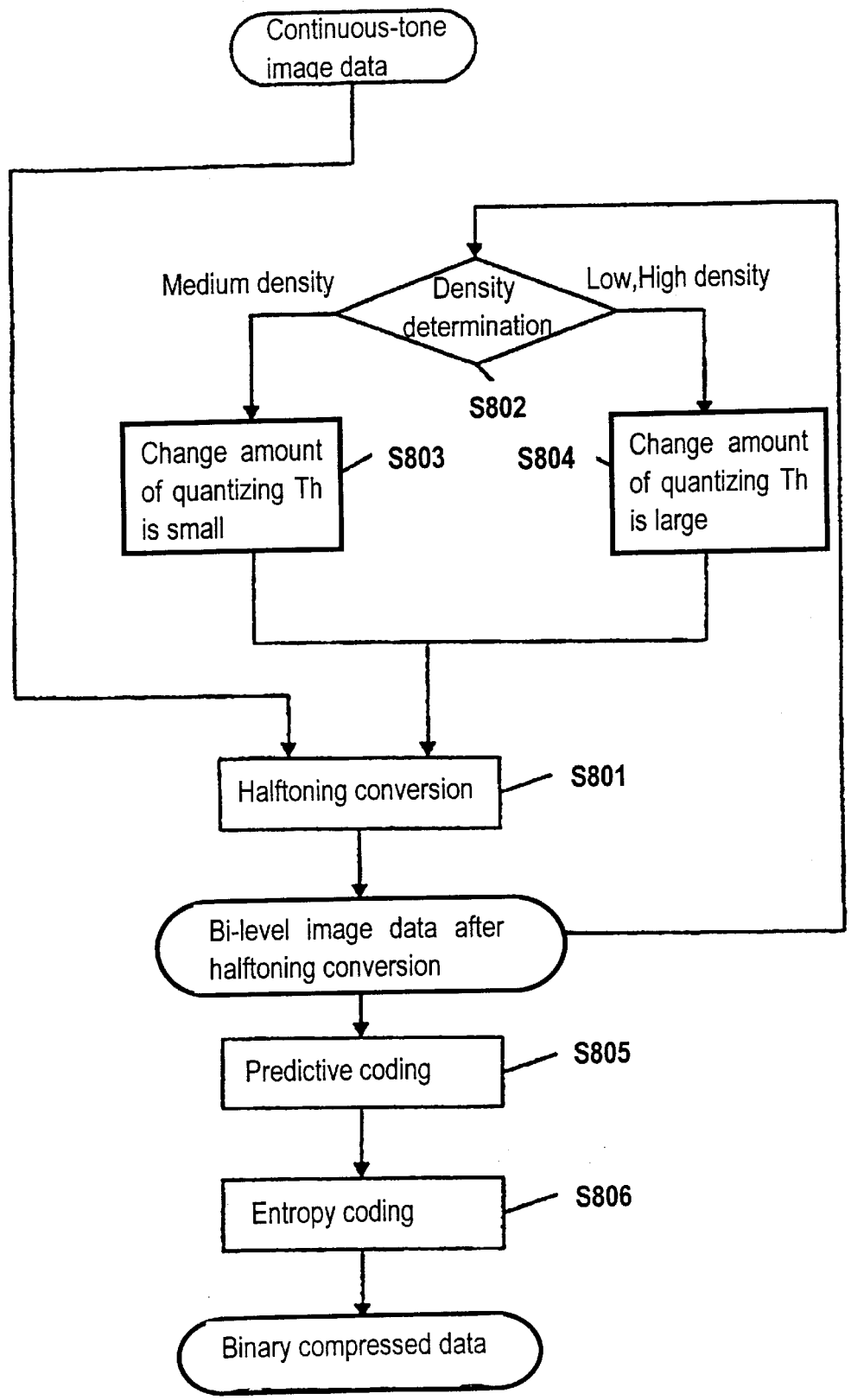
FIG. 6 is a flowchart illustrating an operation of the image coding apparatus for a continuous-tone image in accordance with the second exemplary embodiment of the present invention.

The second exemplary embodiment of the present invention is demonstrated hereinafter with reference to FIG. 5 through FIG. 7. FIG. 5 illustrates a structure of an image coding apparatus for a continuous-tone image in accordance with the second exemplary embodiment of the present invention. FIG. 6 is a flowchart illustrating an operation of the image coding apparatus for a continuous-tone image in accordance with the second exemplary embodiment.

First, controller 801 receives an input image data, i.e. a continuous-tone image data from data-input section 802, then transfers the data to halftoning converter 804, which provides a halftoning conversion to this data (S801). However, when coded surrounding pixels are available, converter 804 transfers the coded surrounding pixel data to density determiner 803. According to the surrounding pixel data, determiner 803 determines which part a low density part, medium density part or high density part a pixel expecting a halftoning conversion belongs to (S802). There are a few methods for determining a region: a method of using a density averaged from respective densities of the coded surrounding pixels, another method is this: Find a probability of the target pixel converted takes "0" responsive to respective patterns of the coded surrounding pixels, and another probability of the target pixel converted takes "1" responsive to respective patterns of the coded surrounding pixels, then determine a region as the medium density part when both the probabilities become approximately even. Other cases are determined the low density and high density parts. This embodiment is not restricted with only these methods. Density parts are not always classified into three, and can be classified into other numbers.

Halftoning converter 804 converts a continuous-tone image data to a bi-level image data through the error-distribution method. At this time, converter 804 refers to the predicted values supplied from table 806 to the coded surrounding pixels, and changes the threshold value so that the probability of outputting the same value as the predicted value becomes strong. Converter 804 then produces the bi-level image data using the changed threshold value. However, when the density determiner produces a result at S802, a value changed from the threshold value is set at a small value (S803) for a region determined as the medium density part. A value changed from the threshold value is set at a large value (S804) for a region determined as the low or high density part. Converter 804 then produces the bi-level image data, i.e. binary image data using the set threshold value (S801).

When a number of classes for determining the density is three or more than three, halftoning converter 804 sets threshold values corresponding to respective classes and then produces bi-level image data using the threshold values. Predictive coding section 805 which is called by controller 801 refers to table 806, predicts a converted value output from halftoning converter 804 based on the information about the coded surrounding pixels, and compares the predicted value with an actual output value. Predictive coding section 805 transforms the binary data into a data sequence so that a pixel hitting the prediction takes "0" and a pixel missing the prediction takes "1" (S805). Then, controller 801 calls entropy-coding section 807, which then provides the binary data sequence with an entropy-coding. This binary data sequence represents hitting or missing the prediction, where this "hit" or "miss" is supplied from predictive coding section 805 (S806). Finally, controller 801 outputs the coded data i.e. binary compressed data from output section 808.

The density determiner is detailed hereinafter with reference to FIG. 7. FIG. 7(a) depicts a case where a density of a part surrounding a target pixel X to be converted in halftoning is determined based on statuses of the four surrounding pixels, i.e. pixels X1–X4. FIG. 7(b) lists probabilities of the coded target pixel X taking "0" or "1" responsive to the four coded surrounding pixels. When the probability "P" is $0.3 \leq P \leq 0.7$, the region is determined medium density, and when the probability "P" takes a value other than the above, the part is determined a low or high density. FIG. 7(c) shows the resultant table. According to this determining method, density determiner 803 thus determines the density using the table shown in FIG. 7(c).

Exemplary Embodiment 3

The third exemplary embodiment of the present invention is demonstrated hereinafter with reference to FIG. 8 and FIG. 9.

Figure 8:
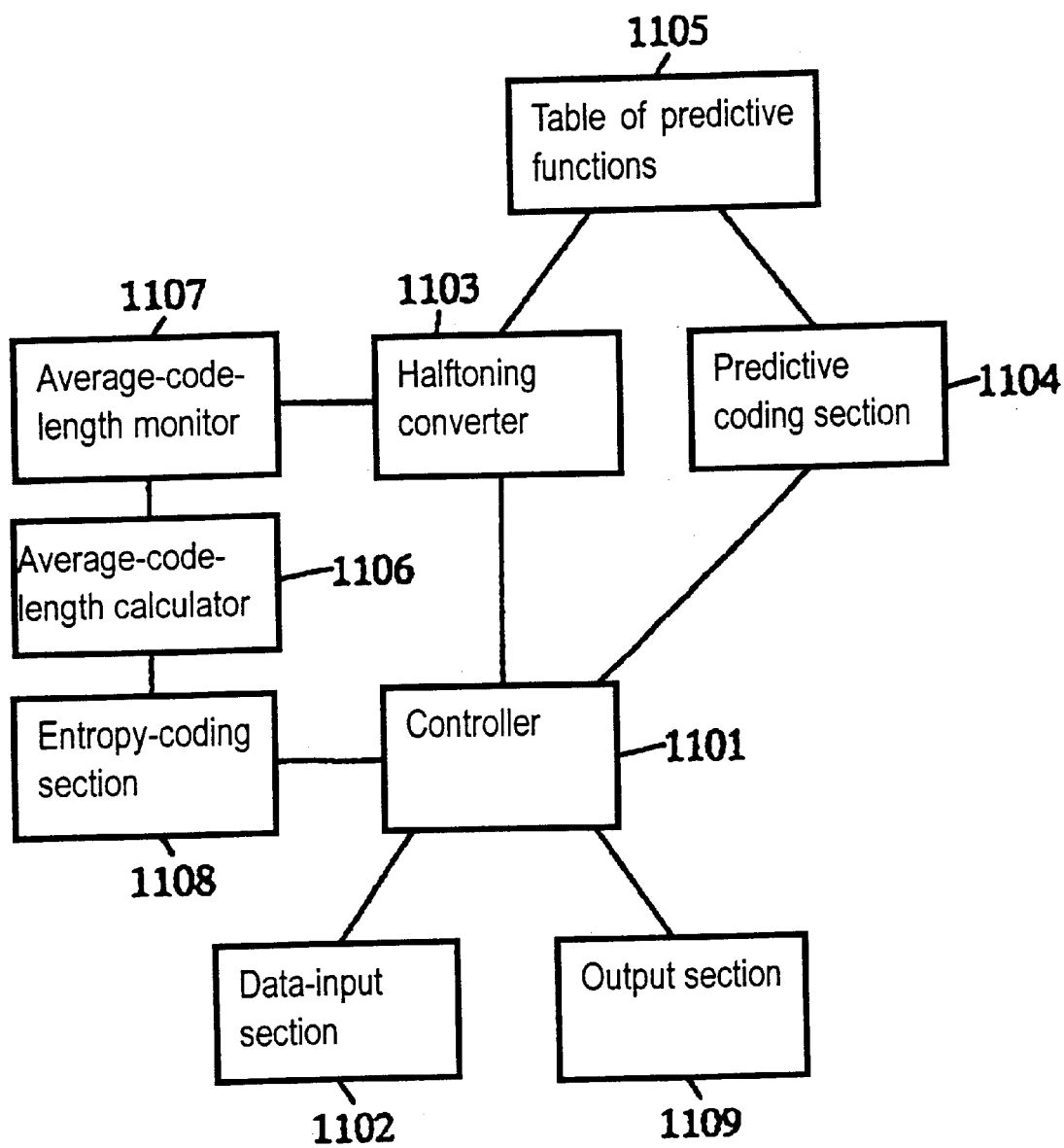
FIG. 8 illustrates a structure of an image coding apparatus for a continuous-tone, image in accordance with a third exemplary embodiment of the present invention.
Figure 9:
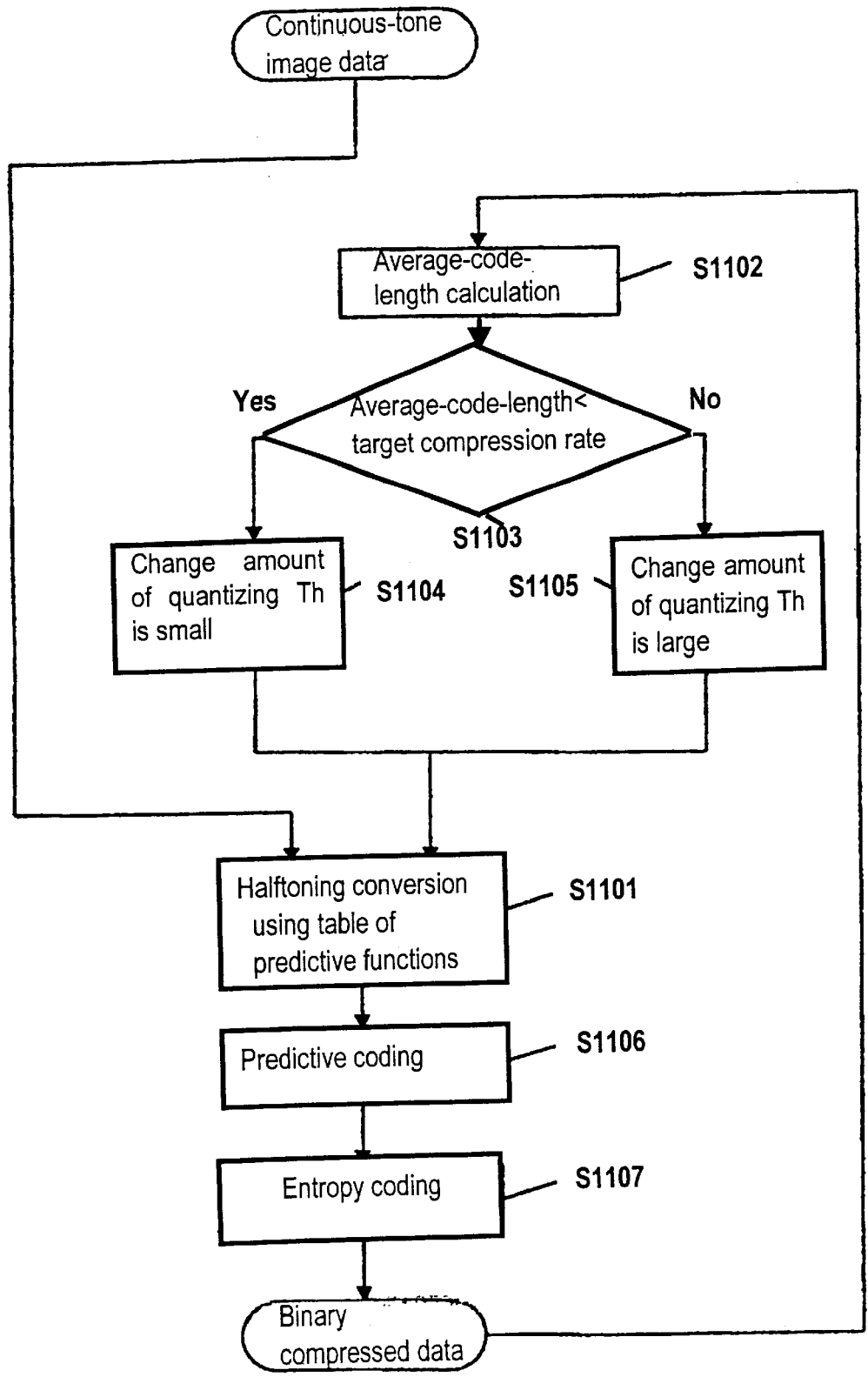
FIG. 9 is a flowchart illustrating an operation of the image coding apparatus for a continuous-tone image in accordance with the third exemplary embodiment of the present invention.

FIG. 8 illustrates a structure of an image coding apparatus for a continuous-tone image in accordance with the third exemplary embodiment of the present invention. FIG. 9 is a flowchart illustrating an operation of the image coding apparatus for a continuous-tone image in accordance with this third embodiment.

First, controller 1101 receives an input image, i.e. a continuous-tone image data, from data-input-section 1102, then transfers the data to halftoning converter 1103, which provides a halftoning conversion to this data (S1101). However, when surrounding pixels coded by entropy-coding section 1108 are available, average-code-length calculator 1106 calculates an average code length of the coded pixels (S1102). Then average-code-length monitor 1107 determines whether the averaged code length is greater or smaller than a target compression rate (S1103).

Halftoning converter 1103 converts a continuous-tone image data to a bi-level image data through the error-distribution method. In other words, converter 1103 refers to the prediction table 1105 to find a predictive value to be converted based on the information about the coded surrounding pixels, and changes the threshold value so that the probability of outputting the same value as the predicted value becomes strong. Converter 1103 then produces the binary data using the changed threshold value. However, when the average-code-length monitor already produced a result (S1103), a threshold value of the pixel of which average code length was determined smaller than the target compression rate is changed in a small quantity (S1104). On the contrary, a threshold value of the pixel of which average code length was determined greater than the target compression rate is changed in a great quantity (S1105). Converter 1103 produces a bi-level image data, i.e. a binary image data using the threshold value thus set (S1101). Controller 1101 calls predictive coding section 1104, and coding section 104 refers to table 1105 listing predictive functions based on the information about the coded surrounding pixels, predicts a converted pixel value, and compares the predicted value with an actual converted value.

Predictive coding section 1104 transforms the binary data into a data sequence so that a pixel hitting the prediction takes "0" and a pixel missing the prediction takes "1" (S1206). Then, controller 1101 calls entropy-coding section 1108, which then provides the binary data sequence with an entropy-coding. This binary data sequence represents hitting or missing the prediction, where this "hit or miss" is supplied from predictive coding section 1104 (S1107). Finally, controller 1101 outputs the coded data i.e. binary compressed data from output section 1109.

Exemplary Embodiment 4

Figure 10:
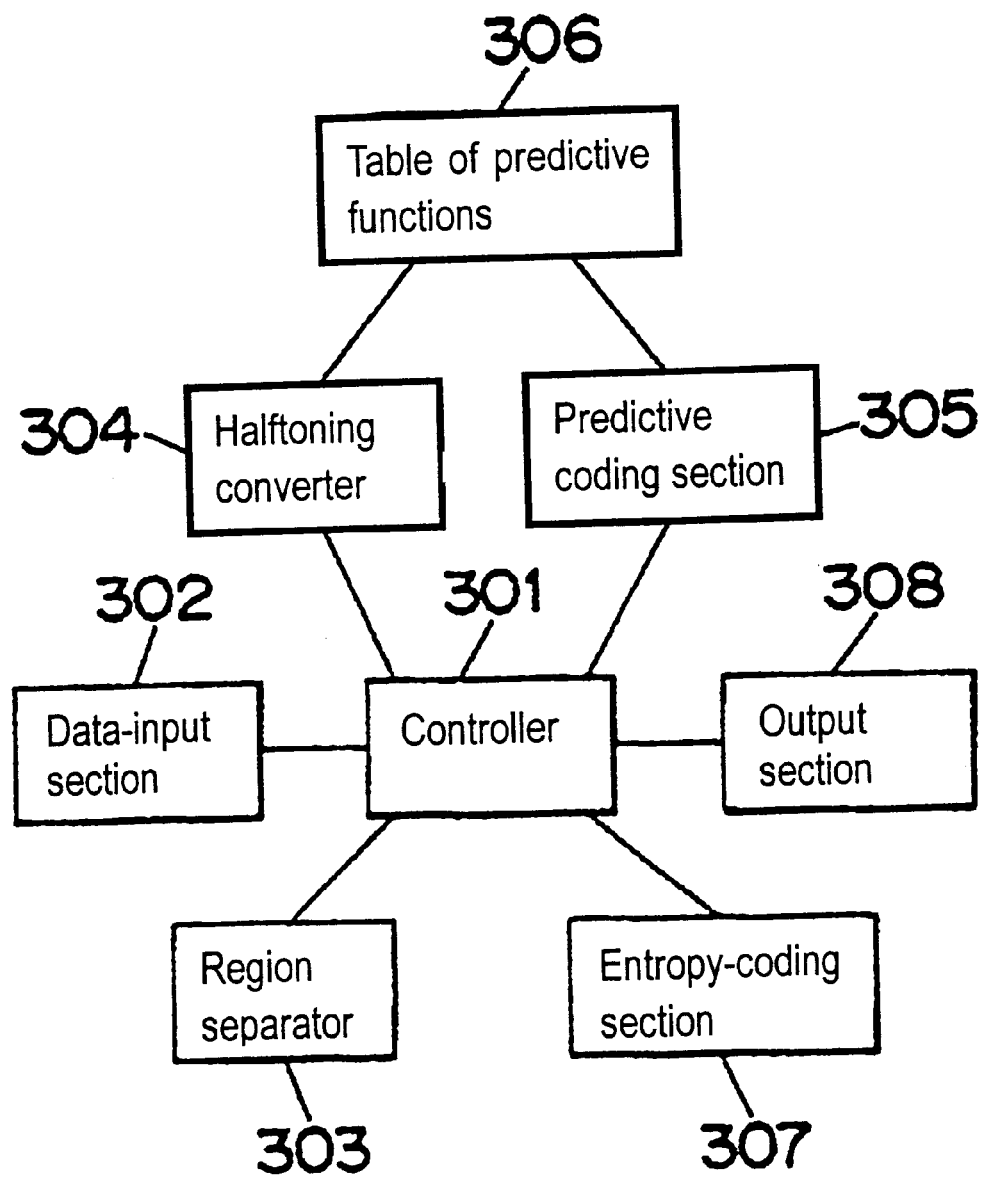
FIG. 10 illustrates a structure of an image coding apparatus for a continuous-tone image in accordance with a fourth exemplary embodiment of the present invention.
Figure 11:
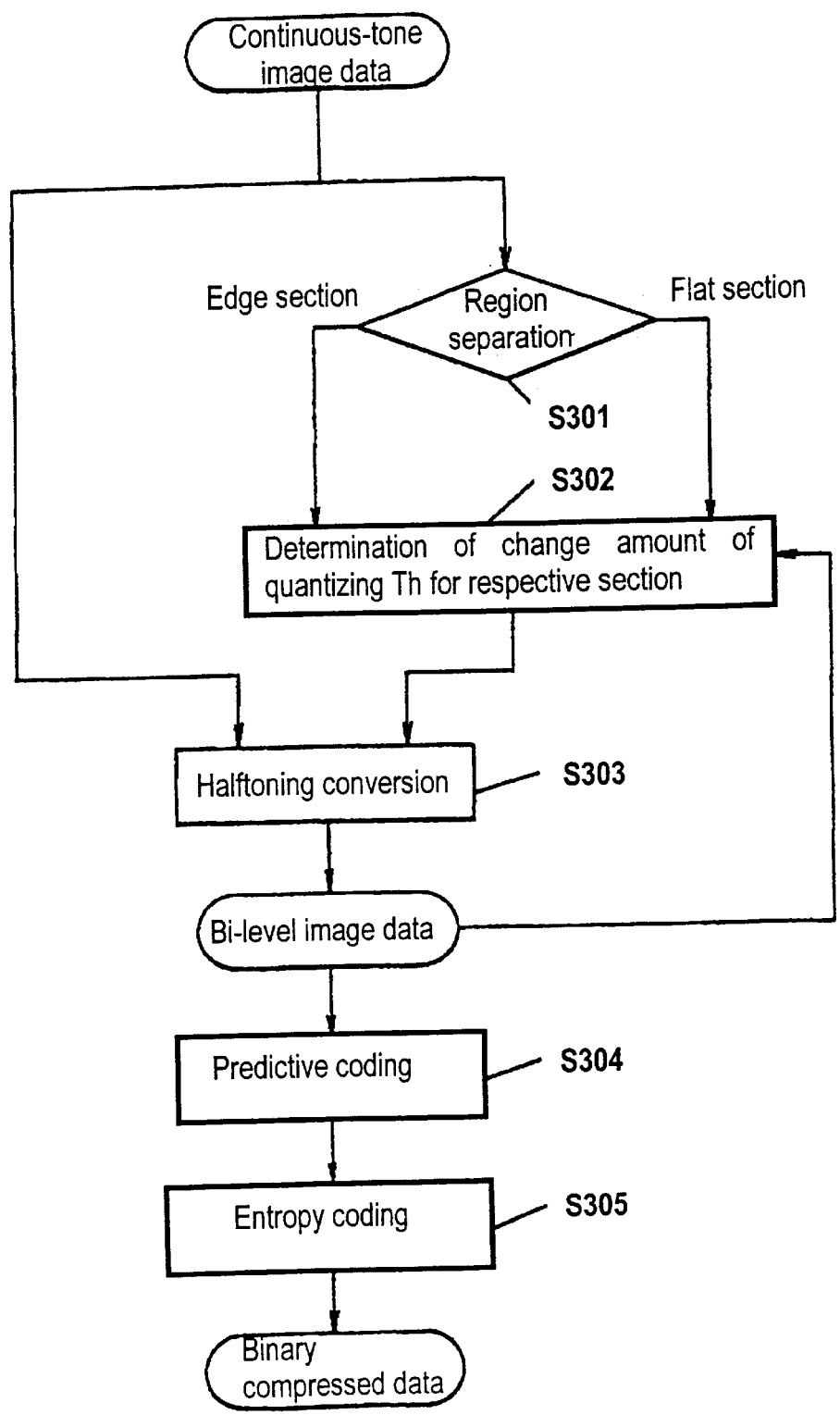
FIG. 11 is a flowchart illustrating an operation of the image coding apparatus for a continuous-tone image in accordance with the fourth exemplary embodiment of the present invention.
Figure 12:
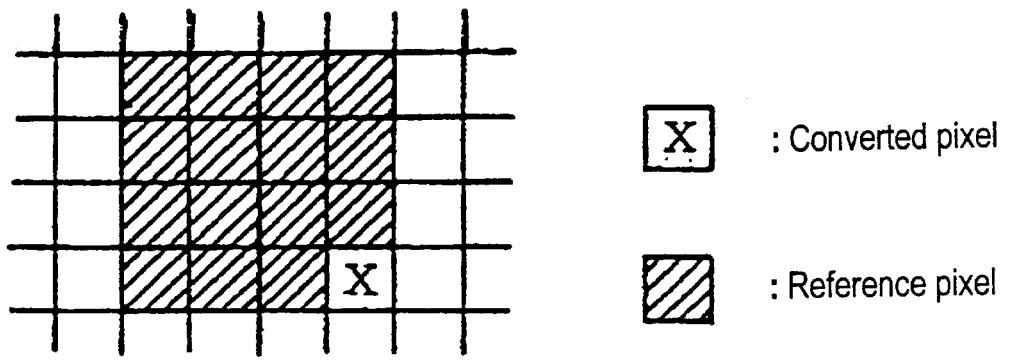
FIG. 12 depicts an example of a region separation of a pixel to be converted.
Figure 13:
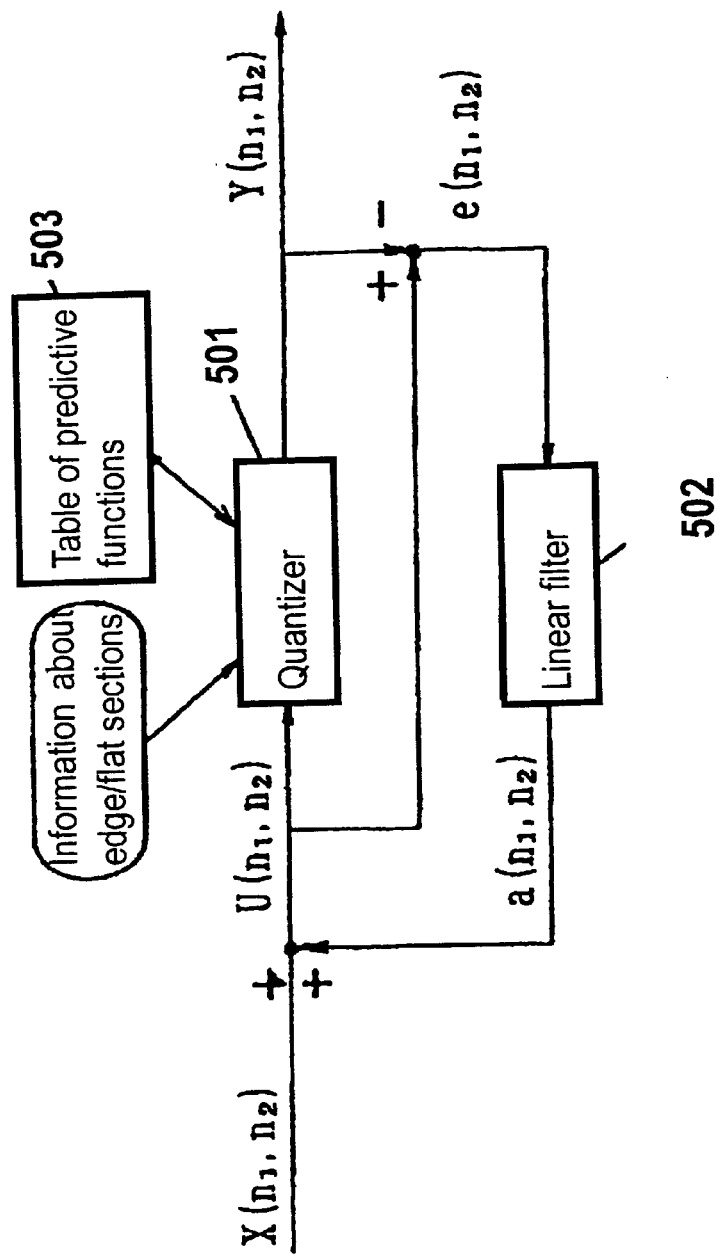
FIG. 13 depicts an error-distribution method.

FIG. 10 illustrates a structure of an image coding apparatus for a continuous-tone image in accordance with the fourth exemplary embodiment of the present invention. FIG. 11 is a flowchart illustrating an operation of the image coding apparatus for a continuous-tone image in accordance with the fourth embodiment. FIG. 12 depicts an example of a region separation of a pixel to be converted. FIG. 13 depicts an error-distribution method. FIG. 14 depicts a pixel to be converted and reference pixels, and a table of predictive functions corresponding to those pixels.

The operating process of image coding apparatus shown in FIG. 10 is demonstrated with reference to the flowchart in FIG. 11.

First, controller 301 receives an input image, i.e. continuous-tone image data, from data-input section 302, and supplies the data to region separator 303.

Second, region separator 303 separates a region into an edge section and a flat section for the continuous-tone image data (S301). Halftoning converter 304 uses the information supplied from separator 303 about the edge and the flat as well as coded surrounding binary image data and refers to table 306 listing predictive functions, so that the threshold value for bi-level coding produced ordinarily through the error-distribution method is changed (S302). Converter 304 then provides binary coding to the continuous-tone image data through the error-distribution method with the changed threshold value (S303).

Controller 301 calls predictive coding section 305, which then refers to table 306, predicts a value based on the information about the coded surrounding pixels and compares the predicted value with the converted value from converter 304. Predictive coding section 305 transforms the binary data into a data sequence so that a pixel hitting the prediction takes "0" and a pixel missing the prediction takes "1" (S304). Then, controller 301 calls entropy-coding section 307, which then provides the binary data sequence with an entropy-coding. This binary data sequence represents hitting or missing the prediction, where this "hit or miss" is supplied from predictive coding section 305 (S305). Finally, controller 301 outputs the coded data from output section 308.

Respective blocks making up the apparatus are detailed hereinafter.

Region separator 303 separates a region into an edge section and a flat section depending on a target pixel to be converted using the pixels surrounding the target pixel.

The region is separated, for example, in the following manner: As shown in FIG. 12, firstly, refer to 16 pixels including a target pixel X to be converted from a continuous-tone image and surrounding 15 pixels. Then determine a section of region as an edge section when a difference between the maximum value and the minimum value of the pixels is greater than the threshold value. When the difference is smaller than the threshold value, determine the section as a flat section. Another method is this: When a distribution of the 16 pixels is greater than the threshold value, determine the section as the edge section. When the distribution is smaller than the threshold value, determine the section as the flat section. The separation is not limited into two sections, i.e. the edge and flat sections, but the region can be separated into three or more than three sections.

Halftoning converter 304 converts a continuous-tone image data into bi-level image data through the error-distribution method.

As shown in FIG. 13, converter 304 adds quantizing-noise "a" (n1, n2) produced responding to actual images to input-pixel-value X (n1, n2) which is a continuous-tone image data. Hereon, (n1,n2) expresses a two dimensional position of a pixel.

Feedback process in FIG. 13 corresponds to this process. Quantizing-noise "a" (n1, n2) is produced by flowing quantizing error "e" (n1, n2) through linear filter 502 as to be decided modulation characteristics by the diffusion of the quantizing error. Quantizer 501 quantizes an input value U (n1, n2) made up by adding noise "a" (n1, n2) to input-pixel-value X (n1, n2), thereby producing output value Y (n1, n2).

A quantization process, in general, is expressed with equation (4), where "Th" is quantizing threshold value. However, in the quantization process in this embodiment, quantizer 501 refers to table 503 listing predictive functions, then changes threshold value "Th", and performs the quantization. In other words, quantizer 501 changes threshold value "Th" so that "Th" increases when the predictive value is "0", and "Th" decreases when the predictive value of output value Y is "1" before performing the quantization. Further, quantizer 501 increases a change amount of the threshold value based on the information about edge/flat sections in region-separation section. In other words, when the section is determined as an edge section, the change amount is increased, and when the section is a flat section the change amount is decreased. This operation allows the probability of hitting of the prediction to be strong as well as the compression rate to increase. At the same time, at the flat section, where an image distortion becomes distinct, the distortion is restrained as little as possible. At the edge section, where the image distortion is vague, the compression rate can be increased.

The quantization processes of edge and flat sections are expressed with the following equations.

When the predicted value takes "0", the edge and flat sections are quantized according to the equations (5) and (6).

When the predicted value takes "1", the edge and flat sections are quantized according to the equations (7) and (8).

$$Y(n1, n2)=1\{U(n1, n2) \geq Th\}, \text{ or}$$

$$0\{U(n1, n2)<Th\} \quad (4)$$

$$Y(n1, n2)=1\{U(n1, n2) \geq Th+\Delta E\}, \text{ or}$$

$$0\{U(n1, n2)<Th+\Delta E\} \quad (5)$$

$$Y(n1, n2)=1\{U(n1, n2) \geq Th+\Delta F\}, \text{ or}$$

$$0\{U(n1, n2)<Th+\Delta F\} \quad (6)$$

$$Y(n1, n2)=1\{U(n1, n2) \geq Th-\Delta E\}, \text{ or}$$

$$0\{U(n1, n2)<Th-\Delta E\} \quad (7)$$

$$Y(n1, n2)=1\{U(n1, n2) \geq Th-\Delta F\}, \text{ or}$$

$$0\{U(n1, n2)<Th-\Delta F\} \quad (8),$$

where $\Delta E$ is a change amount of the threshold value at the edge section, $\Delta F$ is a change amount of the threshold value at the flat section.

The relation between the change amounts of $\Delta E$ and $\Delta F$ is this: $\Delta E > \Delta F > 0$ Next, predictive coding section 305 refers to table 306 based on coded pixels surrounding the pixel to be coded, then predicts whether the pixel to be coded is "0" or "1". A number of the reference pixels to be used for the prediction may be four pixels or 12 surrounding pixels. FIG. 14 shows a table listing predictive functions in a case of four surrounding pixels as reference pixels. FIG. 14(*a*) shows an arrangement of reference pixels, and FIG. 14(*b*) shows a table storing predicted values. Addresses of table 306 are referred to based on the statuses of surrounding pixels X1–X4, and value X0 on the address is predicted. When predicted value X0 hits the actual output value from converter 304, pixel X takes "0", and when value X0 misses, pixel X takes "1", so that the predictive coding is performed.

Finally, entropy-coding section 307 provides an entropy-coding to the binary data sequence produced by predictive coding section 305. Huffman coding or arithmetic coding is one of the entropy-coding methods. Controller 303 outputs the coded data i.e. binary compressed data from output section 308.

In this embodiment, as discussed above, when a data is converted to a bi-level data, a change amount of a threshold value can be set at a small value at a section where image distortion is distinct. The change amount can be set at a great value at a section where image distortion is vague. A continuous-tone image data can be thus converted to the binary image data of high quality and at a high compression rate.

Exemplary Embodiment 5

Figure 15:
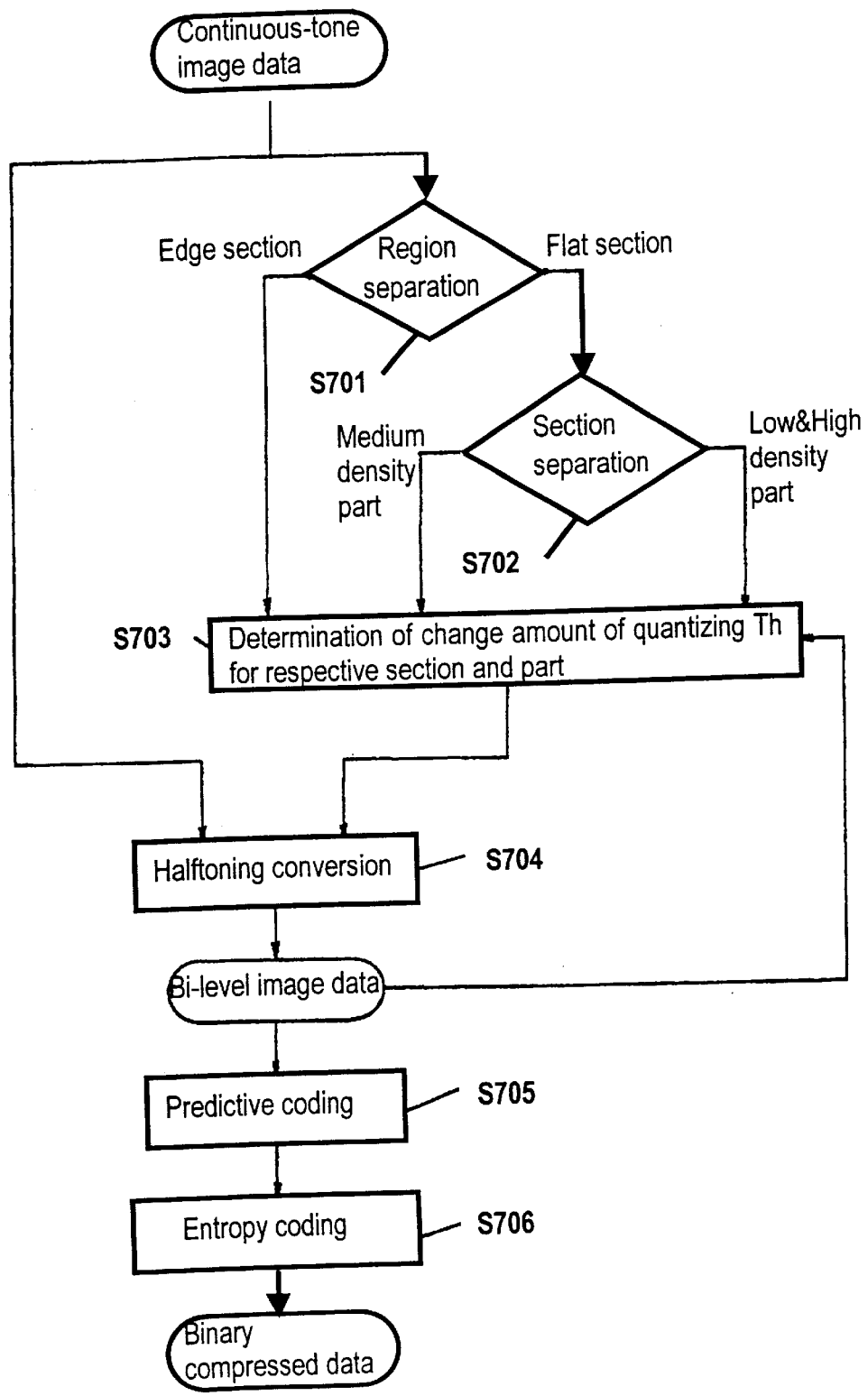
FIG. 15 is a flowchart illustrating an operation of the image coding apparatus for a continuous-tone image in accordance with the fifth exemplary embodiment of the present invention.

FIG. 15 is a flowchart illustrating an image coding operation by the image coding apparatus for a continuous-tone image in accordance with the fifth exemplary embodiment. The structure of the apparatus is the same as that used in the fourth embodiment.

An image coding process by this apparatus is demonstrated hereinafter with reference to FIG. 15.

First, controller 301 receives an input image, i.e. a continuous-tone image data, then transfers the data to region separator 303, which then separates regions into edge sections and flat sections referring to the pixels surrounding the target pixel to be undergoing a halftoning conversion (S701). When a section is assigned to be a flat section, the section is further separated into a "medium" density part and a "low and high" density part (S702).

Halftoning converter 304 uses the information supplied from region separator 303 about the edge and the flat, and densities of medium, low and high as well as coded surrounding binary image data, and refers to table 306 listing predictive functions, so that the threshold value for bi-level coding produced ordinarily through the error-distribution method is changed (S703). Converter 304 then encodes the continuous-tone image data into a bi-level image data i.e. binary image data through the error-distribution method with the changed threshold value (S704).

Controller 301 calls predictive coding section 305, which refers to table 306. Section 305 predicts a converted value based on the information about the coded surrounding pixels and compares the predicted value with an actual converted value. Predictive coding section 305 transforms the binary data into a data sequence so that a "hit" pixel of the prediction takes "0" and a "miss" pixel of the prediction takes "1" (S705).

Then, controller 301 calls entropy-coding section 307, which provides the binary data sequence with an entropy-coding. This binary data sequence represents hitting or missing of the prediction, where this "hit or miss" is supplied from predictive coding section 305 (S706). Finally, controller 301 outputs the coded data i.e. binary compressed data from output section 308.

Region separator 303 and halftoning converter 304 are specifically detailed hereinafter.

Region separator 303 separates a region into an edge section and a flat section depending on a target pixel to be converted using the pixels surrounding the target pixel. Separator 303 further separates the flat section into a "medium" density part, and a "low and high" density part. This separation depending on the density, e.g. as shown in FIG. 12, is performed in the following procedure. First, refer to total 16 pixels including a target pixel to be converted from a continuous-tone image into bi-level image and 15 reference pixels. Second, average the densities of the pixels, and finally, determine the parts to be a medium density part, low and high density part referring to the average density. The separation is not limited to two parts, but it may be three or more than three parts.

Halftoning converter 304 converts a continuous-tone image data into bi-level image data through the error-distribution method.

When the halftoning conversion is carried out through the regular error-distribution method as shown in FIG. 13, a quantization process, in general, is expressed with equation (9), where "Th" is quantizing threshold value. In the quantization process in this embodiment, quantizer 501 refers to table 503 listing predictive functions, then changes threshold value "Th", and performs the quantization. In other words, quantizer 501 changes threshold value "Th" so that "Th" increases when the predictive value is "0", and "Th" decreases when the predictive value of output value Y is "1" before performing the quantization. Further, quantizer 501 varies a change amount of the threshold value based on the information about edge/flat sections in the region-separator and densities of medium, low and high. In other words, when the region is determined as an edge section, the change amount is increased by quantizer 501, and when the region is a flat section the change amount is decreased. Further, the change amount is increased in the "low and high" density part at the flat section, and decreased in the "medium" density part.

This operation allows the probability of hitting of the prediction to be strong as well as the compression rate to increase. At the same time, at a section, where an image distortion becomes distinct, the distortion is restrained as little as possible. At another section, where the image distortion is vague, the compression rate can be increased.

The quantization processes of edge and flat sections, and the medium density part at the flat section as well as the low and high density part at the flat section are expressed with the following equations.

When the predicted value takes "0", the sections and parts defined above are quantized according to the equations (10), (11) and (12).

When the predicted value takes "1", the sections and parts defined above are quantized according to the equations (13), (14) and (15).

$$Y(n1, n2)=1\{U(n1, n2) \geq Th\}, \text{ or}$$
$$0\{U(n1, n2)<Th\} \quad (9)$$

$$Y(n1, n2)=1\{U(n1, n2) \geq Th+\Delta E\}, \text{ or}$$
$$0\{U(n1, n2)<Th+\Delta E\} \quad (10)$$

$$Y(n1, n2)=1\{U(n1, n2) \geq Th+\Delta L, H\}, \text{ or}$$
$$0\{U(n1, n2)<Th+\Delta L, H\} \quad (11)$$

$$Y(n1, n2)=1\{U(n1, n2) \geq Th+\Delta M\}, \text{ or}$$
$$0\{U(n1, n2)<Th+\Delta M\} \quad (12)$$

$$Y(n1, n2)=1\{U(n1, n2) \geq Th-\Delta E\}, \text{ or}$$
$$0\{U(n1, n2)<Th-\Delta E\} \quad (13),$$

$$Y(n1, n2)=1\{U(n1, n2) \geq Th-\Delta L, H\}, \text{ or}$$
$$0\{U(n1, n2)<Th-\Delta L, H\} \quad (14)$$

$$Y(n1, n2)=1\{U(n1, n2) \geq Th-\Delta M\}, \text{ or}$$
$$0\{U(n1, n2)<Th-\Delta M\} \quad (15),$$

where $\Delta E$, is a change amount of the threshold value at the edge section, $\Delta L$, H is a change amount of the threshold value at the low and high density parts of the flat section, and $\Delta M$ is a change amount of the threshold value at the medium density part of the flat section.

The relation among the change amounts of $\Delta E$, $\Delta L$, H and $\Delta M$ is this:

$\Delta E > \Delta M > 0$, and no large and small relation is determined between $\Delta E$ and $\Delta L$, H.

In this embodiment, as discussed above, when a data is converted to a bi-level data, a change amount of a threshold value can be set at a small value at a section where image distortion is distinct. The change amount can be set at a great value at a section where image distortion is vague. A continuous-tone image data can be thus converted to the image data of high quality and at a high compression rate.

Exemplary Embodiment 6

Figure 16:
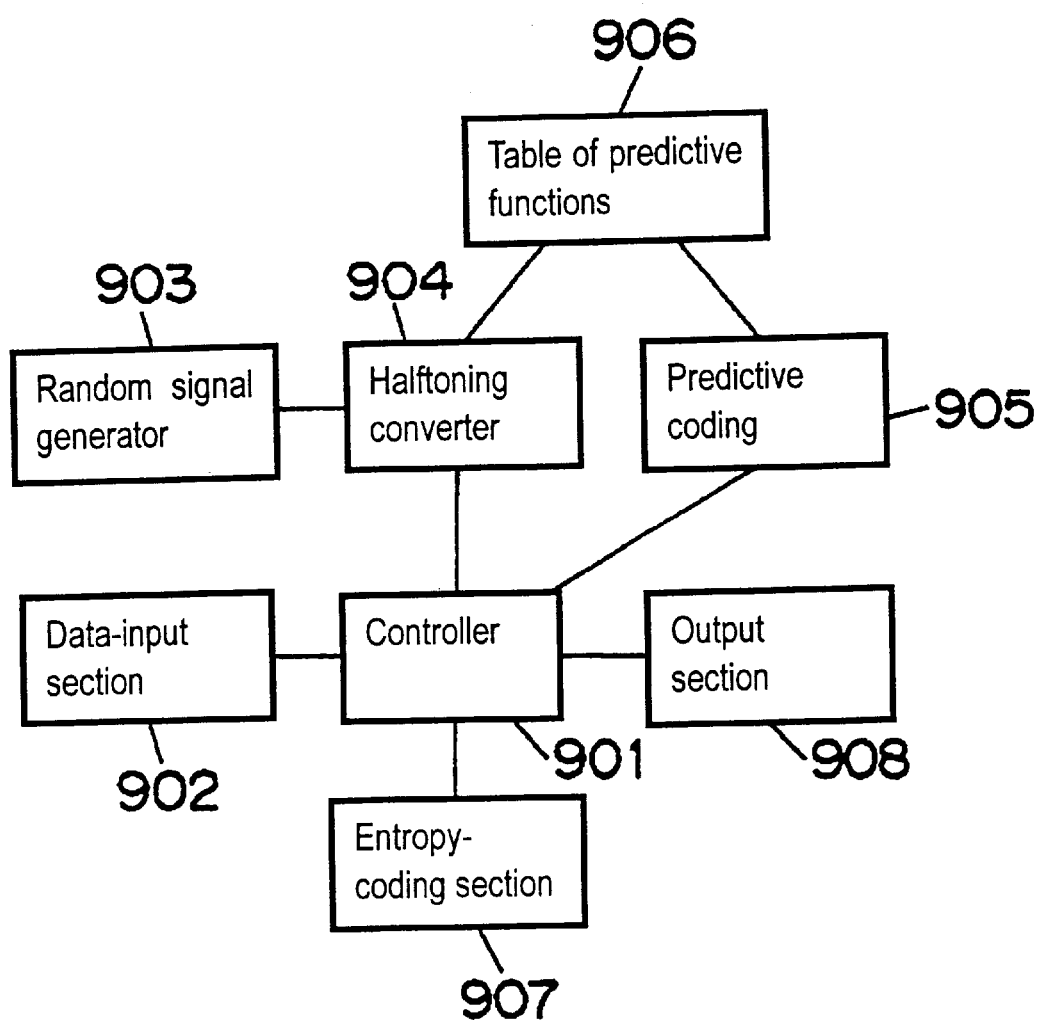
FIG. 16 illustrates a structure of an image coding apparatus for a continuous-tone image in accordance with a sixth exemplary embodiment of the present invention.
Figure 17:
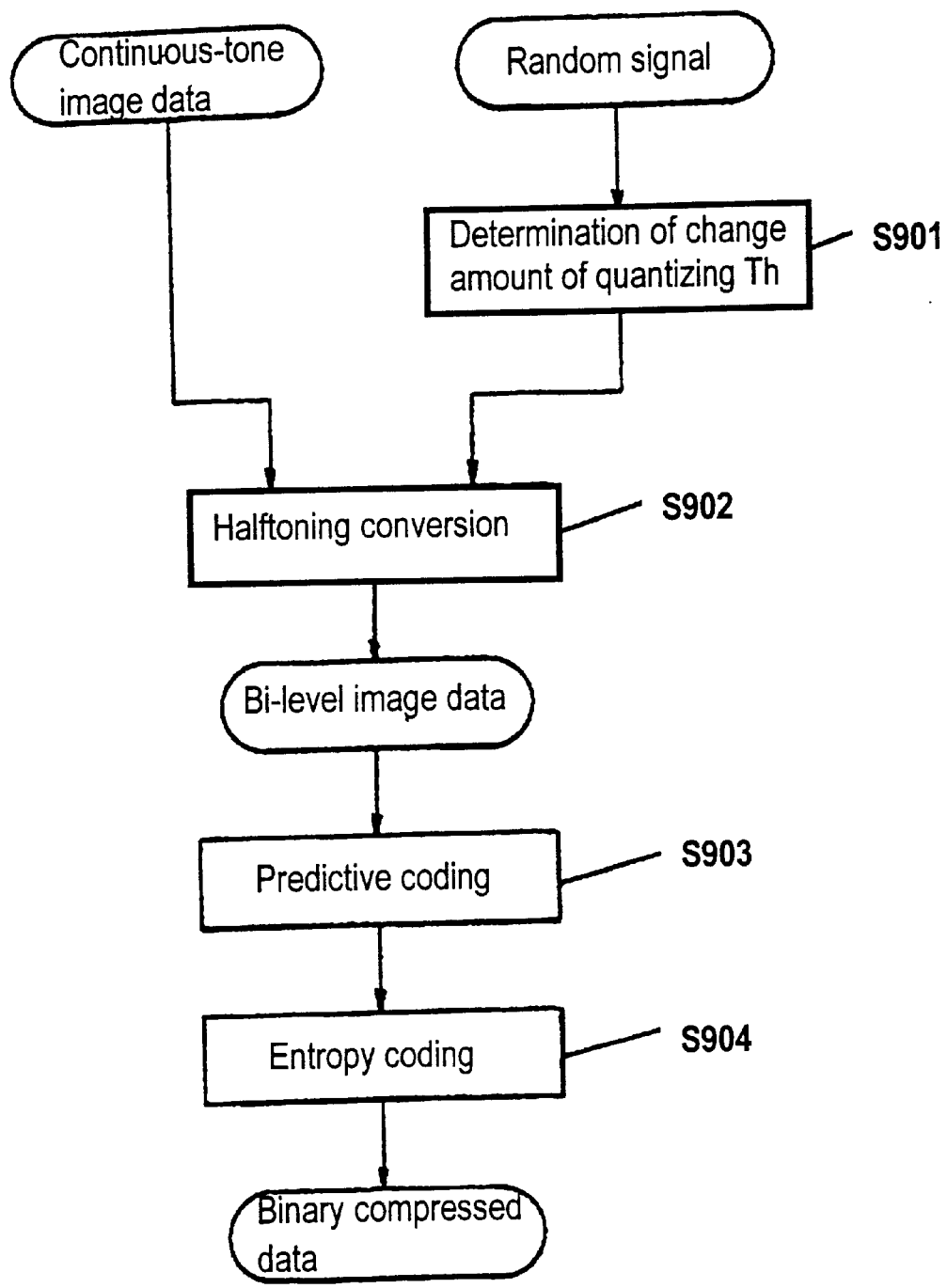
FIG. 17 is a flowchart illustrating an operation of the image coding apparatus for a continuous-tone image in accordance with the sixth exemplary embodiment of the present invention.

FIG. 16 illustrates a structure of an image coding apparatus for a continuous-tone image in accordance with the sixth exemplary embodiment of the present invention. FIG. 17 is a flowchart illustrating an operation of the image coding apparatus for a continuous-tone image in accordance with the sixth embodiment.

The operating process of image coding apparatus shown in FIG. 16 is demonstrated with reference to the flowchart in FIG. 17.

In FIG. 16, firstly, controller 901 receives an input image data, i.e. continuous-tone image data, from input section 902, and supplies the data to halftoning converter 904.

Next, random-signal-generator 903 generates a bi-level random signal (0 or 1) for each pixel to be undergoing the halftoning conversion. Halftoning converter 904 receives the random signal, and when the signal is "0", a quantizing threshold value is changed from a binary threshold value for the regular error-distribution method. When the signal is "1", a binary threshold value for the halftoning conversion is determined so that the quantizing threshold value cannot be changed (S901). Converter 904 converts a continuous-tone image data to a bi-level image data using the determined threshold value (S902).

Controller 901 calls predictive coding section 907, which then refers to table 906, predicts a value based on the information about the coded surrounding pixels and compares the predicted value with the output value from converter 904. Predictive coding section 907 transforms the binary data into a data sequence so that a pixel hitting of the prediction takes "0" and a pixel missing of the prediction takes "1" (S903).

Then, controller 901 calls entropy-coding section 907, which then provides the binary data sequence with an entropy-coding. This binary data sequence represents hitting or missing of the prediction, where this "hit or miss" is supplied from predictive coding section 905 (S904). Finally, controller 901 outputs the binary compressed data from output section 908.

A threshold value for the bi-level coding due to the data supplied from random-signal-generator 903 can be changed in the following way: The threshold value can be changed responsive to bi-level random-signals, or the threshold value can be set responsive to respective signal values of multi-level random-signals. Random-signal-generator 903 can be replaced with region separator 303 used in the fourth and fifth embodiments so that the change amount of threshold value can be changed when a specific section, e.g. a flat section, occurs in series.

As such, this embodiment prevents image distortions such as moire occurring when the change amount of threshold is increased and a specific pattern appears in series. As a result, a continuous-tone image is coded to bi-level image maintaining quality picture at a high compression rate.

Exemplary Embodiment 7

Figure 18:
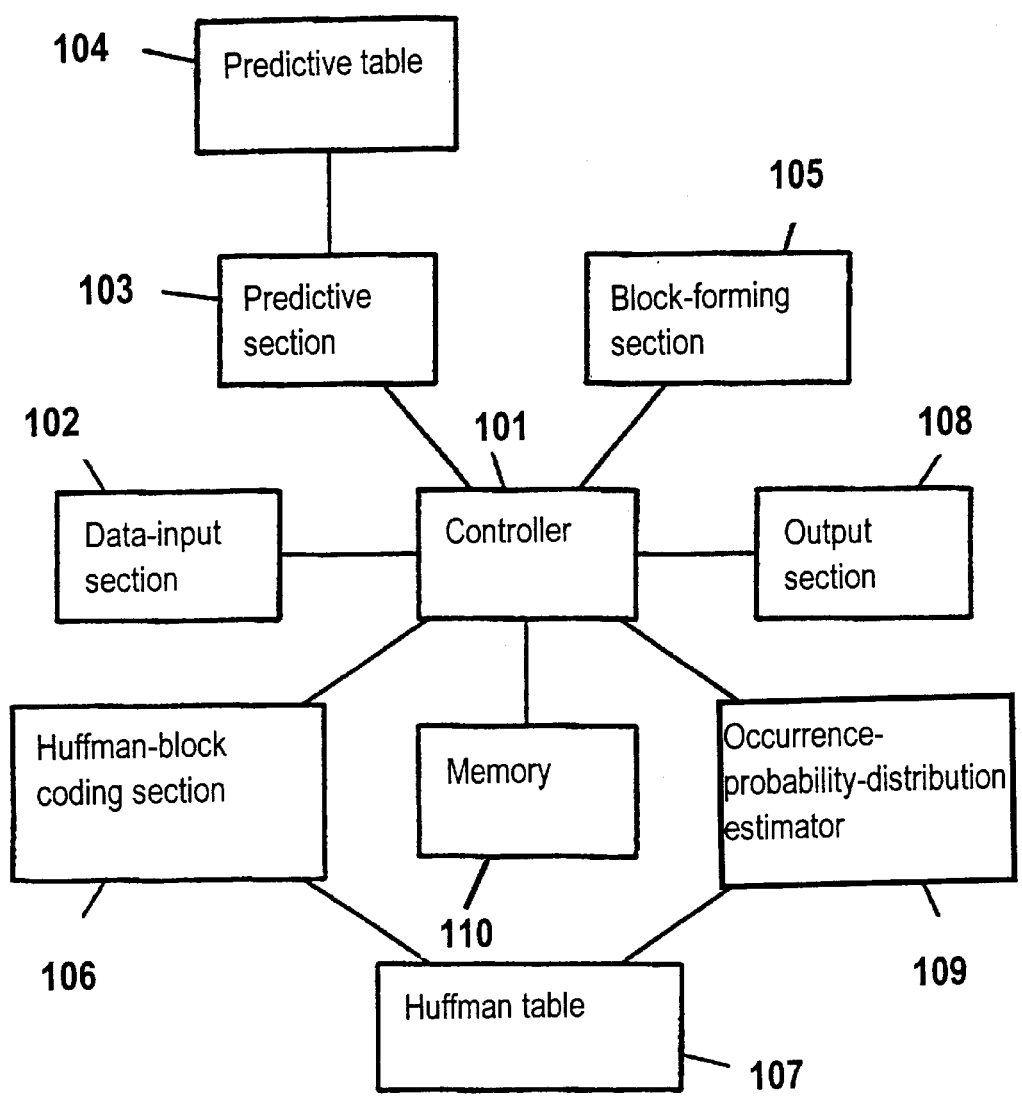
FIG. 18 illustrates a structure of a binary coding apparatus in accordance with a seventh exemplary embodiment of the present invention.

FIG. 18 is a block diagram of a binary coding apparatus in accordance with the seventh exemplary embodiment of the present invention.

Figure 19:
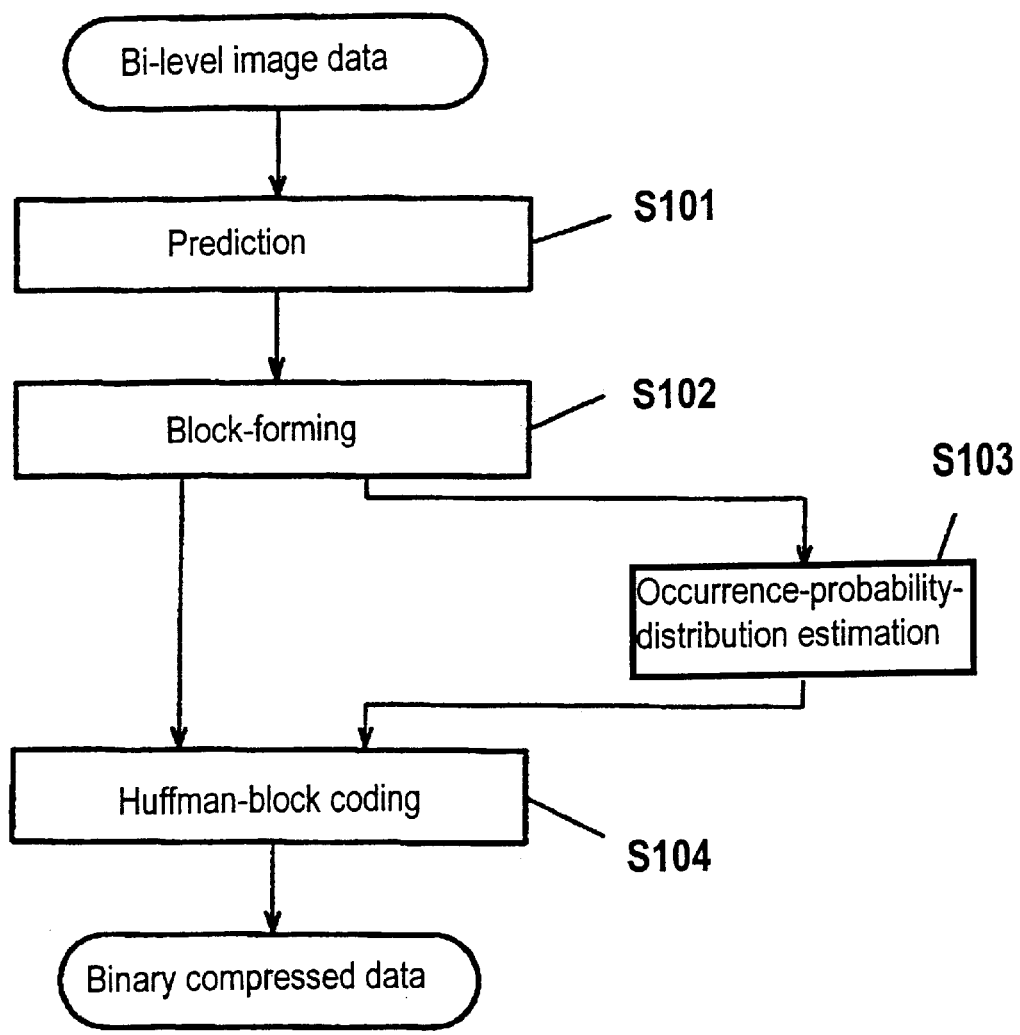
FIG. 19 is a flowchart illustrating an operation of the binary coding apparatus in accordance with the seventh exemplary embodiment of the present invention.

FIG. 19 is a flowchart illustrating an operation of the binary coding apparatus in accordance with this embodiment.

The operating process of image coding apparatus shown in FIG. 18 is demonstrated with reference to the flowchart in FIG. 19.

In FIG. 18, firstly, controller 101 receives an input image, i.e. bi-level image data, from data-input section 102, then transfers the data to predictive section 103. Predictive section 103 then refers to predictive table 104, compares the predicted value of bi-level image data i.e. binary image data with an actual value, then produce a data sequence where hitting of the prediction is expressed with "0" and missing is expressed with "1" (S101). The data output from predictive section 103 is a data sequence indicating "hit" or "miss" of the prediction". Controller 101 transfers this data sequence to block-forming section 105, where the data sequence is converted to a blocked data formed by M×N pixels (S102).

Controller 101 transfers a blocked data to Huffman-block coding section 106 where blocked data are sequentially coded and occurrence-probability-distribution estimator 109. Interlocking with this coding operation of the Huffman-blocks, controller 101 transfers blocked data surrounding a target block to be coded to occurrence-probability-distribution estimator 109. Estimator 109 then refers to the surrounding blocked data, and determines an occurrence-probability-distribution model of the surrounding blocked data (S103). Huffman-block coding section 106 selects a Huffman-table optimum to the distribution model determined by estimator 109 out of Huffman Tables 107, and provides the target block with Huffman coding using the selected Huffman table (S104).

Finally, controller 101 outputs a binary compressed data from data output section 108. Regarding the operation of controller 101, memory 110 storing a control program for controller 101 is coupled to controller 101, so that the program controls the operations of each module (each block making up the apparatus). This is one of controlling methods.

Each block is described in detail hereinafter.

First, predictive section 103 refers to predictive table 104 based on coded pixels surrounding a target pixel to be coded, and predicts the target pixel to be "0" or "1". A number of the surrounding pixels used for the prediction can be four or more than four. FIG. 20(a) is a pixel map showing reference pixels, and FIG. 20(b) is a predictive table (storing predicted values) depicting a case where four surrounding pixels are used as reference pixels. Addresses of table 104 are referred to based on the statuses of surrounding pixels X1–X4, and value X0 on the address is predicted. When predicted value X0 hits an actual pixel value X, pixel X takes "0", and when value X0 misses an actual pixel value X, pixel X takes "1", so that the data as discussed above is output.

Block-forming section 105 converts the data sequence indicating "hit" or "miss" of the prediction into blocked data a single block formed of M×N pixels. Since each pixel is formed of one bit data expressing "hit" or "miss" of the prediction, the blocked data formed of M×N pixels becomes M×N bits data. A block size can be changed. For instance, when the blocks hitting the predictions are arrayed in series, those blocks are reduced into one block, and a Huffman table corresponding to the block is created, thereby realizing to code a block.

Occurrence-probability-distribution estimator 109 refers to blocks surrounding a target block to be coded, and determines an occurrence-probability-distribution model of the target pixel. A method of determining the model is, e.g. to utilize a number of prediction "miss" pixels included in four pixels surrounding the target pixel.

Figure 21:
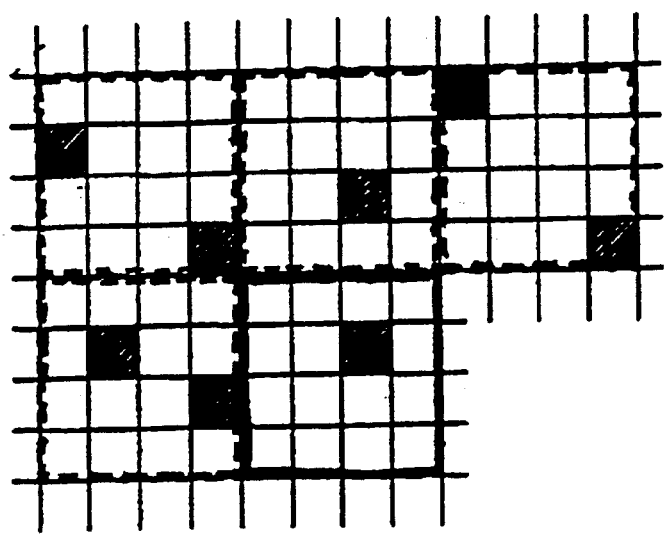
FIG. 21 illustrates the reference blocks surrounding a block to be coded, and this block formed by 4×4 pixels is used for determining an occurrence probability distribution model.
Figure 21:
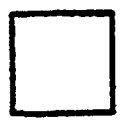
Figure 21:
Figure 21:
Figure 21:
Figure 21:
Figure 21:

FIG. 21 depicts the reference blocks surrounding the target block to be coded, the reference blocks are used for determining the occurrence-probability-distribution model when the block is formed of 4×4 pixels. Blocks surrounded by broken lines are reference blocks, and a block surrounded by solid lines is a target block. When one block is formed of 4×4=16 pixels, the surrounding four blocks can include maximum 64 prediction "miss" pixels. Therefore, there are maximum 64 occurrence-probability-distribution models of the target block. In the case of FIG. 21, the surrounding 4 blocks include 7 prediction "miss" pixels, and the model of the target block is thus determined to be the seventh one. The model can be determined in another way: instead of referring to the blocked data of the blocks surrounding the target block, the data of "hit" and "miss" of the predictions can be directly referred to.

Finally, Huffman-block coding section 106 provides the target block with Huffman-block coding. Huffman-block coding section 106 selects a Huffman-table optimum to the distribution model determined by estimator 109 out of Huffman Tables 107, and uses the selected Huffman table when coding. In the case of FIG. 21, i.e. a block is formed of 4×4 pixels and the occurrence-probability-distribution model is determined depending on a number of prediction "miss" pixels included in the surrounding 4 blocks, Huffman Table 107 stores 64 tables respectively optimum to each model. Huffman table can be created by, e.g. an image for learning has been prepared before creating the table, or the table is created optimally using the target image.

The seventh embodiment as discussed above has the following four steps so that an occurrence-probability-distribution of a data of a target block to be coded can be estimated from the data of blocks surrounding the target block as well as Huffman-block coding can be provided to the target block by using the Huffman table optimum to the estimated occurrence-probability-distribution model. As a result, the image coding is obtainable at a high compression rate. The four steps are listed below:

S101: a predicting step for predicting a binary image;

S102: a block forming step for transforming the data sequence indicating "miss" and "hit" of the predictions done in S101, and producing a blocked data;

S103: a model determining step for determining an occurrence-probability-distribution model by referring to the blocked data of the blocks surrounding the target block to be undergoing Huffman-block coding; and S104: a coding step for providing the target block with Huffman-block coding by switching Huffman Table to a table optimally designed to the occurrence-probability-distribution model.

This seventh embodiment also comprises the following four elements so that the same advantages as discussed above are achievable. As a result, binary image coding is obtainable at a high compression rate. The five elements are listed below:

(a) predictive section 103 for predicting a binary image;

(b) block-forming section 105 for converting the data sequence indicating "miss" and "hit" of the predictions into blocks thereby producing blocked data;

(c) occurrence-probability-distribution estimator 109 for determining the occurrence-probability-distribution model by referring to the blocked data of the blocks surrounding the target block to be undergoing Huffman-block coding; and (d) controller 101 for controlling an overall operation.

Exemplary Embodiment 8

Figure 22:
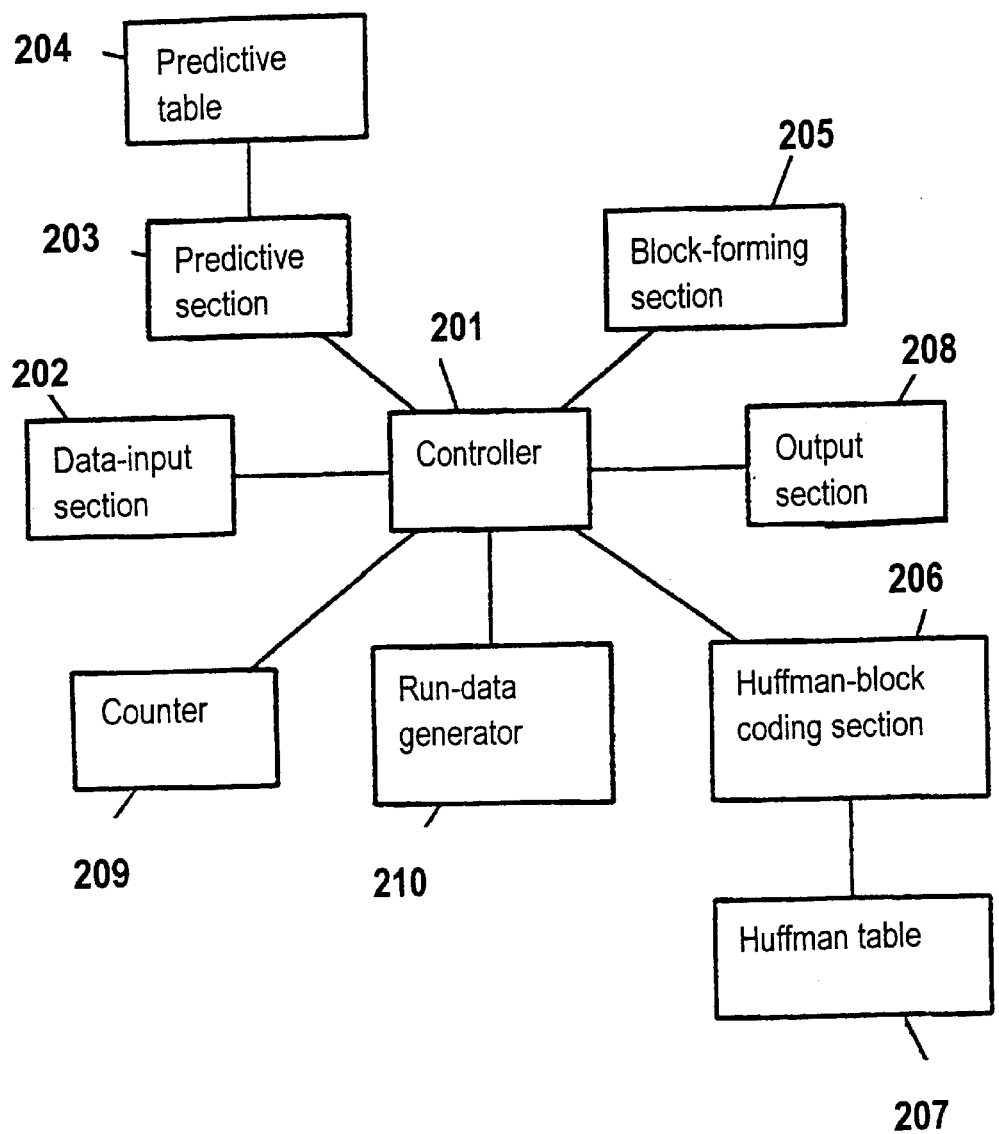
FIG. 22 illustrates a structure of an image coding apparatus for a bi-level image in accordance with an eighth exemplary embodiment of the present invention.

FIG. 22 is a block diagram illustrating a structure of binary coding apparatus in accordance with the eighth exemplary embodiment of the present invention.

Figure 23:
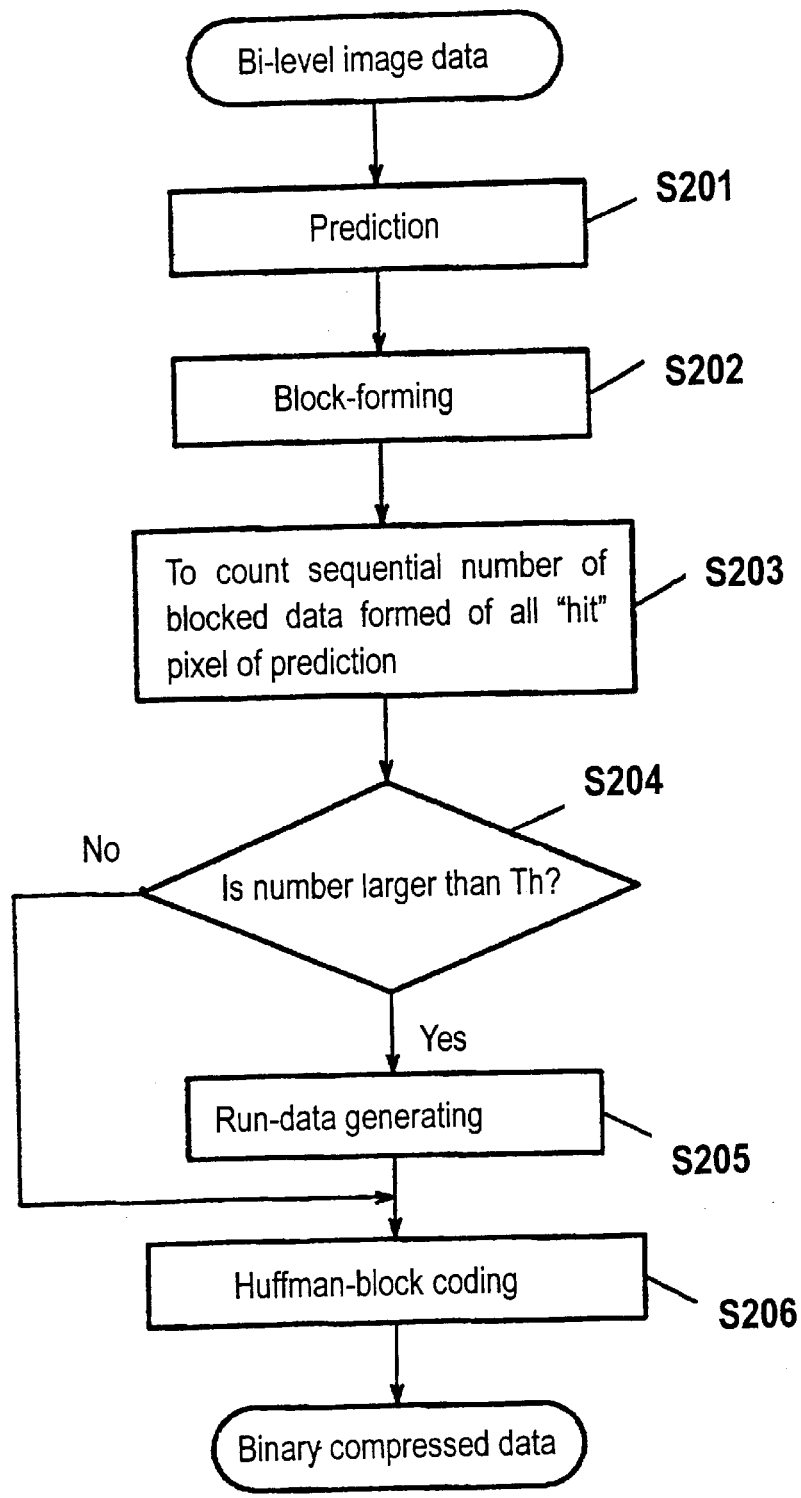
FIG. 23 is a flowchart illustrating an operation of the image coding apparatus for a bi-level image in accordance with the eighth exemplary embodiment of the present invention.

The operating process of image coding apparatus shown in FIG. 22 is demonstrated with reference to the flowchart in FIG. 23.

In FIG. 22, firstly, controller 201 receives an input image, i.e. bi-level image data, from data input section 202, then transfers the data to predictive section 203. Predictive section 203 then refers to predictive table 204, compares the predicted value of binary image with an actual value, then produce a binary data sequence indicating "hit" and "miss" of the predictions(S201). The data output from predictive section 203 is a data sequence indicating "hit" or "miss" of the prediction. Controller 201 transfers this data sequence to block-forming section 205, where the data sequence is converted to a blocked data formed by M×N pixels (S202).

Next, controller 201 calls counter 209, which counts sequential numbers when all the pixels of the blocked data are formed of "hit" pixels of the predictions and those blocks are arrayed in series (S203). Controller 201 then compares the number counted by counter 209 with a predetermined threshold value (S204). During the counted number is smaller than the threshold value, controller 201 transfers the data to Huffman-block coding section 206. During the counted number is greater than the threshold value, controller 201 transfers the data to run-data generator 210(S204). The generator 210 which is called by controller 201 finds a number exceeding the threshold value and converts the number into run-data (S205).

Controller 201 then transfers the data to Huffman-block coding section 206, which encodes either one of the blocked data or the run-data into Huffman-block-using Huffman table 207 based on the following criterion (S206): When the number of sequential blocks formed of all "hit" pixels of the predictions is smaller than the threshold value, the blocked data is performed to Huffman-block coding. On the contrary, when the number is greater than the threshold value, the run data is performed to the coding. Finally, controller 201 outputs the binary compressed data from data-output section 208.

Counter 209 and run-data generator 210 are detailed hereinafter.

Counter 209 counts a number of sequential blocks formed of all "hit" pixels of the predictions.

Figure 24:
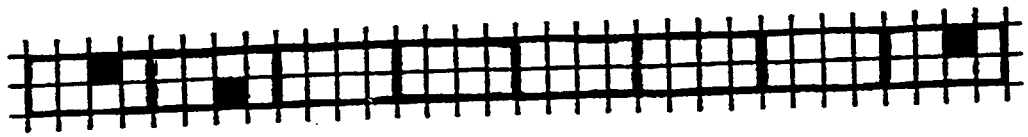
FIG. 24 illustrates how to count sequential numbers of a blocked-data.
Figure 24:
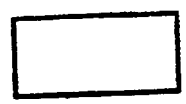
Figure 24:
Figure 24:

FIG. 24 illustrates the counting of blocked data in series. When a block is formed of 4×2 pixels as shown in FIG. 24, counter 209 counts "5" because there are five blocks sequentially arrayed and formed of all "hit" pixels of the predictions. In this case, the threshold value is e.g. "2", the counted number "5" is greater than the threshold value "2". Therefore the number "3" overflowing the threshold value "2", is converted into run-data and then performed into a Huffman-block coding. On the other hand, when the threshold value is e.g. "8", the counted number "5" is smaller than the threshold value "8", then the-blocked data is performed a Huffman-block coding. Regarding a value of the threshold, it can be changed depending on what kind of a target image to be coded is, i.e. the target image is a natural image or a computer graphic (CG) image.

Figure 25:
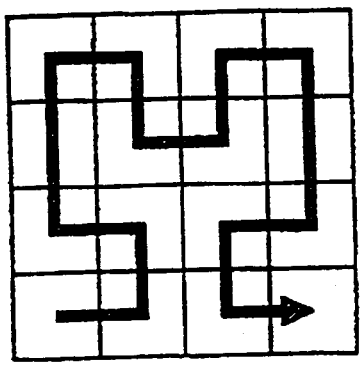
FIG. 25 depicts a sequence of scanning to count the sequential numbers of the blocked data.
Figure 25:
Figure 25:
Figure 28:
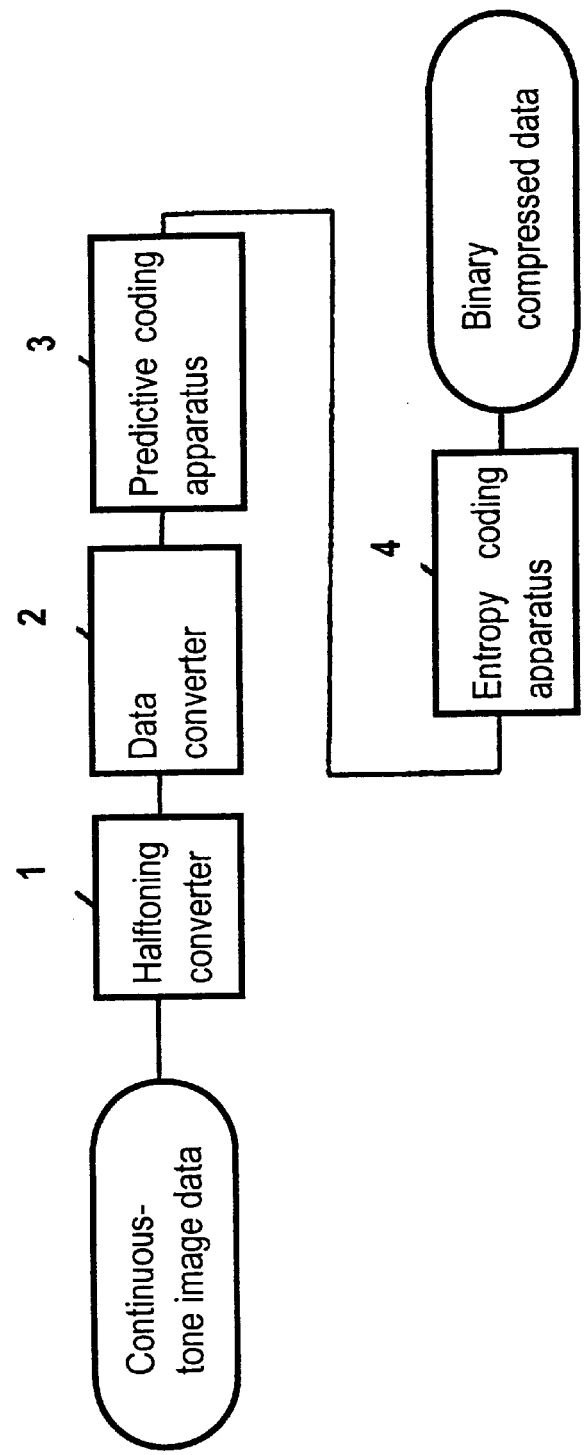
FIG. 28 is a block diagram illustrating a conventional halftoning conversion of a continuous-tone image and a conventional compressing method thereof.
Figure 29B:
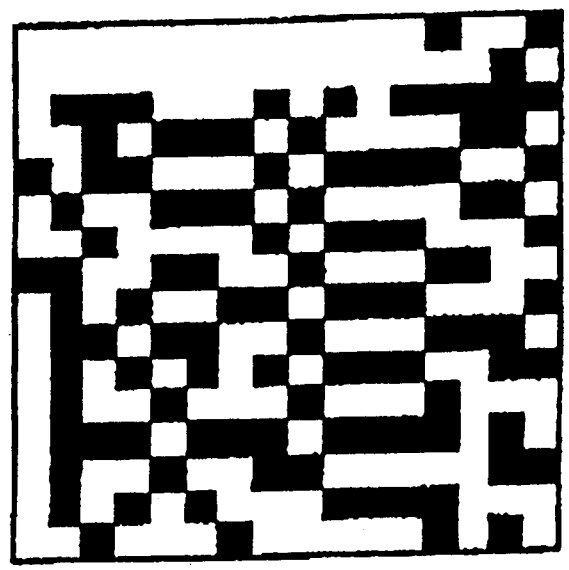
FIG. 29(b) depicts a binary image data after the data conversion.
Figure 29A:
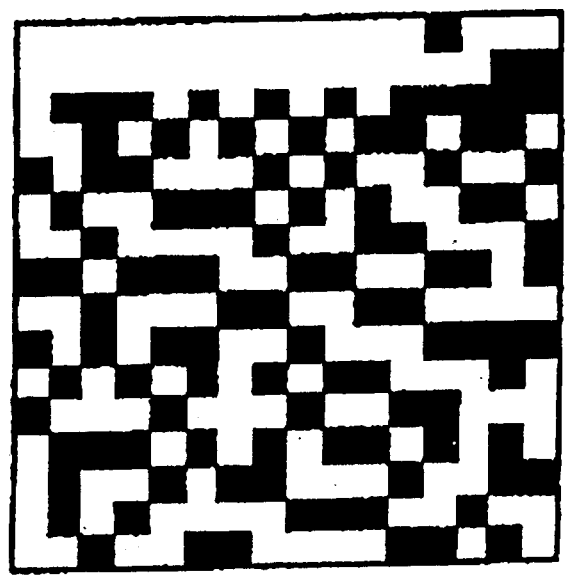
FIG. 29(a) depicts a binary image data before the data conversion.
Figure 30B:
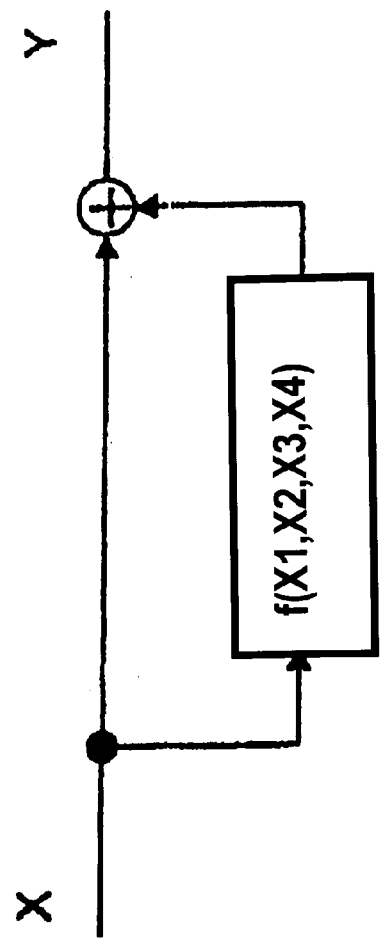
FIG. 30(b) is a block diagram illustrating the predictive coding of the binary image data.
Figure 30A:
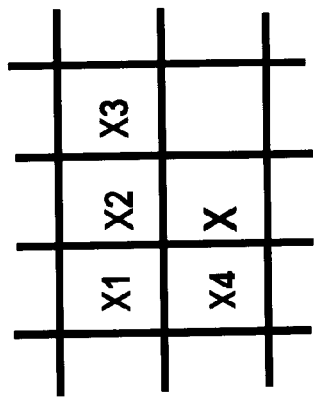
FIG. 30(a) illustrates reference pixels at a predictive coding of a binary image data.

When the threshold value takes "2", two sequential blocks formed of all "hit" pixels represents a flag for the run-data to start. Counter 209 thus counts a number of sequential blocks formed of all "hit" pixels. FIG. 25 illustrates another scanning method, i.e. Hilbert sequence scanning, than the method of raster sequence scanning in counting the number of sequential blocks.

The Hilbert sequence scanning method, as shown in FIG. 25, decreases local redundancy in the image thereby obtaining the longer run-length. As a result, the compression rate is increased. When the number counted by counter 209 exceeds the threshold value, run-data generator 210 creates a run-data expressing the number overflowing the threshold value.

FIG. 26(a) through FIG. 26(e) illustrate the blocked data and run-data in the case of threshold value standing at "2". The blocked data is 8-bit code because the data is formed of 4×2=8 pixels. As shown in FIG. 26(a), a blocked data has 8 bits, and the upper left bit is named the most significant bit (MSB) as well as the lower right bit is the least significant bit (LSB). Pixels hitting of the predictions take "0" and pixels missing of the predictions take "1". In the first block, the third pixel is "1" and other pixels are "0", thus the first blocked data is expressed "0x20" in hexadecimal notation. FIG. 26(c) shows blocked data of the hexadecimal notation data formed of 8 bits and constructed as shown in FIG. 26(b). In this case, when two blocked-data expressed "0x00" are arrayed in series at the threshold value "2", these two blocks are to be followed by the run-data expressing a number of sequential blocked data of "0x00". FIG. 26(d) shows the run-data produced from the blocked data shown in FIG. 26(c). In other words, the data of "0x03" following the two sequential data of "0x00" is a run-data indicating that three data of "0x00" follows in series. Since the blocked data is formed of 8 pixels as shown in FIG. 26(b), the blocked data expressing "hit" and "miss" of the predictions is an 8-bit code. If the maximum run-data value is expressed "255" the run-data indicating a number of blocks formed of all "hit" pixels of the predictions the run-data can be expressed in 8-bit binary data as same as the blocked data, therefore, the run data can be coded in the same table used for Huffman-block coding. However, the appearance frequency of respective run-data is different from that of blocked data, and thus a corresponding table can be produced through considering these appearance frequencies, thereby increasing the efficiency.

FIG. 27 is a table showing the correspondence between respective run-data of which maximum run length is 255 and Huffman-codes. In the table, the run-data of 255 expressed "0xFF" appearing most frequently is allotted with a Huffman code expressed "0x00" also appearing most frequently, and the run-data of 254 expressed "0xFE" appearing least frequently is allotted with a Huffman code expressed "0xFF" also appearing least frequently is allotted. By using the table shown in FIG. 27, the run-data "0x03" shown in FIG. 26(d) is converted into Huffman code "0x80" as illustrated in FIG. 26(e). The Huffman-block coding is provided to the run-data in this way discussed above.

The eighth embodiment as discussed above has the following five steps so that a plurality of blocks are converted as a lump of run-data and are performed Huffman-block coding. As a result, binary image coding is obtainable at a high compression rate. The five steps are listed below:

S201: a predicting step for predicting a binary image;

S202: a block forming step for transforming the data sequence indicating "miss" and "hit" of the predictions done in S101, and producing a blocked data;

S204, S205: converting step for converting a blocked data into a run-data expressing a number of sequential blocks formed of all "hit" pixels of predictions when the number of the sequential blocks overflows a threshold value;

S206: a coding step for coding the run-data converted from the blocked data in S204, S205 into a Huffman-block, and otherwise, coding the blocked data into a Huffman-block.

This eighth embodiment also comprises the following five elements so that the same advantages as discussed above are achievable. As a result, binary image coding is obtainable at a high compression rate. The five elements are listed below:

(a) predictive section 203 for predicting a binary image;

(b) block-forming section 205 for converting the data sequence indicating "miss" and "hit" of the predictions into blocks thereby producing blocked data;

(c) run-data generator 202 for converting a blocked data into a run-data expressing a number of sequential blocks formed of all "hit" pixels of predictions when the number of the sequential blocks overflows a threshold value;

(d) Huffman-block coding section 206 for coding the run-data converted from the blocked data in S204, S205 into a Huffman-block run-data generator 202 converts the blocked data into the run-data, and otherwise, coding the blocked data into a Huffman-block; and (e) controller 201 for controlling an overall operation.

What is claimed is:

1. A method of image coding for coding a continuous-tone image into a binary coded image; said method including:

a first halftoning converting step for producing first bi-level image data by quantizing continuous-tone image data of whole pixels in a section including a target pixel and pixels surrounding the target pixel; and a predicting step for providing second bi-level image data by predicting data at the target pixel based on data at the surrounding pixels;

a predictive coding step for determining respective differences between the first and second bi-level image data for the whole pixels in the section; and a threshold changing step for changing a threshold value used at said first halftoning converting step in responsive to the determined respective differences;

wherein the first bi-level image is produced in said first halftoning converting step so that a prediction in said predicting step becomes strong.

2. The method of image coding as defined in claim 1, further comprising:

a step for determining a density of the section, wherein said threshold changing step comprises changing the threshold value in responsive to the determined respective differences and the determined density.

3. The method of image coding as defined in claim 1, wherein said halftoning converting step includes an averaged code-length monitoring step for monitoring an averaged code-length, and the change amount of the threshold value is set responsive to the averaged code-length for producing the binary coded image.

4. A recording medium readable by a computer, said recording medium including a program of making the computer execute an image coding method, said method comprising:

a first halftoning converting step for producing first bi-level image data by quantizing continuous-tone image data of whole pixels in an section including a target pixel and pixels surrounding the target pixel;

a predicting step for providing second bi-level image data by predicting data at the target pixel based on data at the, surrounding pixels;

a predictive coding step for determining respective differences between the first and second bi-level image data for the whole pixels in the section; and a threshold changing step for changing a threshold value used at said first halftoning converting step responsive to the determined respective differences;

wherein the first binary coded image is produced in said first halftoning converting step so that a prediction in said predicting step becomes strong.

5. The recording medium as defined in claim 4, wherein said method further comprises a step for determining a density of the section, and wherein said threshold changing step comprises changing the threshold value in responsive to the determined respective differences and the determined density.

6. The recording medium as defined in claim 5, wherein said halftoning converting step includes an averaged code-length monitoring step for monitoring an averaged code-length, and the change amount of the threshold value is set responsive to the averaged code-length for producing the binary coded image.

7. An image coding apparatus comprising:

a halftoning converter for producing first bi-level image data by quantizing a continuous-tone image data of whole pixels in a section including a target pixel and pixels surrounding the target pixel;

predicting means for providing second bi-level image data by predicting data at the target pixel based on data at the surrounding pixels;

predictive coding means for determining respective differences between the first and second bi-level image data for the whole pixels in the section;

threshold changing means for changing a threshold value used at said first halftoning converting step in responsive to the determined respective differences, wherein said halftoning converter produces the first binary coded image so that said predicting means provides a strong prediction in providing the second bi-level image data.

* * * * *

UNITED STATES PATENT AND TRADEMARK OFFICE
CERTIFICATE OF CORRECTION

PATENT NO. : 6,801,664 B1
DATED : October 5, 2004
INVENTOR(S) : Kobayashi et al.

It is certified that error appears in the above-identified patent and that said Letters Patent is hereby corrected as shown below:

Title page,
Item [54], Title, delete the Title in its entirety and insert:
-- CODING A CONTINUOUS-TONE IMAGE WITH HALFTONING --

Drawings,
Figs. 7A and 7C should read

| X1 | X2 | X3 | X4 | DENSITY DETERMINATION |
|----|----|----|----|----|
| 0 | 0 | 0 | 0 | L, H |
| 0 | 0 | 0 | 1 | L, H |
| 0 | 0 | 1 | 0 | L, H |
| 0 | 0 | 1 | 1 | L, H |
| 0 | 1 | 0 | 0 | L, H |
| 0 | 1 | 0 | 1 | L, H |
| 0 | 1 | 1 | 0 | M |
| 0 | 1 | 1 | 1 | M |
| 1 | 0 | 0 | 0 | M |
| 1 | 0 | 0 | 1 | M |
| 1 | 0 | 1 | 0 | L, H |
| 1 | 0 | 1 | 1 | L, H |
| 1 | 1 | 0 | 0 | L, H |
| 1 | 1 | 0 | 1 | M |
| 1 | 1 | 1 | 0 | L, H |
| 1 | 1 | 1 | 1 | L, H |

| X1 | X2 | X3 |
|----|----|----|
| X4 | X | |

L: LOW DENSITY
H: HIGH DENSITY
M: MEDIUM DENSITY

FIG. 7a    FIG. 7c

Column 11,
Equation 11, line 48, replace "$Y(n1, n2) = 1 \{ U(n1, n2) \geq Th + \Delta L, H \}$, or" with
-- $Y(n1, n2) = 1 \{ U(n1, n2) \geq Th + \Delta_{LH} \}$, or --
Equation 11, line 50, replace "$0 \{ U(n1, n2) < Th + \Delta L, H \}$" with
-- $0 \{ U(n1, n2) < Th + \Delta_{LH} \}$ --
Equation 14, line 58, replace "$Y(n1, n2) = 1 \{ U(n1, n2) \geq Th - \Delta L, H \}$, or" with
-- $Y(n1, n2) = 1 \{ U(n1, n2) \geq Th - \Delta_{LH} \}$, or --
Equation 14, line 60, replace "$0 \{ U(n1, n2) < Th - \Delta L, H \}$" with
-- $0 \{ U(n1, n2) < Th - \Delta_{LH} \}$ --

UNITED STATES PATENT AND TRADEMARK OFFICE
CERTIFICATE OF CORRECTION

PATENT NO. : 6,801,664 B1
DATED : October 5, 2004
INVENTOR(S) : Kobayashi et al.

It is certified that error appears in the above-identified patent and that said Letters Patent is hereby corrected as shown below:

Column 18,
Line 18, replace "the," with -- the --
Line 36, replace "5" with -- 4 --

Signed and Sealed this

Fourteenth Day of June, 2005

JON W. DUDAS
*Director of the United States Patent and Trademark Office*